US009119169B2

(12) United States Patent
Luo et al.

(10) Patent No.: US 9,119,169 B2
(45) Date of Patent: Aug. 25, 2015

(54) BEACON GROUP INFORMATION ASSISTED WIRELESS LOCATION DETERMINATION

(71) Applicant: QUALCOMM Incorporated, San Diego, CA (US)

(72) Inventors: Xun Luo, San Diego, CA (US); An M Chen, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 14/055,688

(22) Filed: Oct. 16, 2013

(65) Prior Publication Data

US 2015/0105099 A1    Apr. 16, 2015

(51) Int. Cl.
*H04W 24/00* (2009.01)
*H04W 64/00* (2009.01)

(52) U.S. Cl.
CPC .................................. *H04W 64/003* (2013.01)

(58) Field of Classification Search
USPC ...................................................... 455/456.1
See application file for complete search history.

(56) References Cited

U.S. PATENT DOCUMENTS

| | | |
|---|---|---|
| 2003/0013146 A1 | 1/2003 | Werb |
| 2006/0092016 A1 | 5/2006 | Modes et al. |
| 2008/0111693 A1 | 5/2008 | Johnson et al. |
| 2008/0130604 A1 | 6/2008 | Boyd |
| 2009/0010484 A1 | 1/2009 | Amidi |

*Primary Examiner* — Joel Ajayi
(74) *Attorney, Agent, or Firm* — Hunter Clark PLLC

(57) ABSTRACT

Disclosed are systems, apparatus, devices, methods, media, products, and other implementations, including a method that includes receiving, at a server, beacon data indicative of a location of an asset tag device, the beacon data determined based on one or more beacon signals received at the asset tag device from one or more transmitters that is each associated with a respective one of group values identifying a corresponding one of a plurality of assigned transmitter groups comprising the respective each of the one or more transmitters. The method also includes determining, at the server, the location of the asset tag device based on the beacon data received at the server from the asset tag device and on the group values respectively associated with the one or more transmitters from which the one or more beacon signals received at the asset tag device were transmitted.

20 Claims, 12 Drawing Sheets

BEACON GROUP INFORMATION ASSISTED WIRELESS LOCATION DETERMINATION

BACKGROUND

One wireless-technology assisted asset tracking solution is to deploy in the field beacon transmitters to transmit beacon messages that are received by an asset tracking device/node. Beacon messages can then be used to deduce the asset tracking device's location. A limitation of current solutions is that beacon transmitters are generally treated with no differentiation other than received signal strength (which may be represented as a Received Signal Strength Indicator (RSSI) values). This creates several limitations, including: 1) unnecessary overload for the asset tracking devices when they receive noisy beacon information (because often they need to send such information back to the server to process due to their own limited processing capacity), and 2) Less than ideal locationing accuracy because RSSI values are not precisely correlated with distance. Factors such as multipath propagation and RF fading along specific pathways could make signals from closer beacon transmitters be received at low signal strength, while signals from farther out beacon transmitter may be received with relatively high signal strength, thus introducing locationing error.

SUMMARY

Disclosed herein are methods, systems, apparatus, devices, products, media and other implementations, including a method that includes receiving, at a server, beacon data indicative of a location of an asset tag device, the beacon data determined based on one or more beacon signals received at the asset tag device from one or more transmitters that is each associated with a respective one of group values identifying a corresponding one of a plurality of assigned transmitter groups comprising the respective each of the one or more transmitters. The method also includes determining, at the server, the location of the asset tag device based on the beacon data received at the server from the asset tag device and on the group values respectively associated with the one or more transmitters from which the one or more beacon signals received at the asset tag device were transmitted.

Embodiments of the method may include at least some of the features described in the present disclosure, including one or more of the following features.

Each of the plurality of assigned transmitter groups may include at least one transmitter, the transmitter groups generated based on at least one proximity criterion.

Determining the location of asset tag device based on the beacon data received at the server from the asset tag device and on the group values may include identifying from the beacon data the one or more transmitters from which the beacon signals were transmitted, and determining from a plurality of data records stored at the server the group values respectively associated with the one or more transmitters.

Determining the group values respectively associated with the one or more transmitters may include matching information included in the received beacon data, identifying the one or more transmitters from which the beacon signals were transmitted, to respective one or more data records from the plurality of data records comprising identifiers identifying the one or more transmitters.

Determining the location of the asset tag device based on the beacon data may include excluding at least some of the beacon data received at the server based on the determined group values respectively associated with the one or more transmitters, and deriving the location of the device using only non-excluded beacon data.

Excluding at least some of the beacon data may include identifying from the determined group values a minority group value, associated with a fewest number of transmitters from the one or more transmitters identified, and excluding a portion of the beacon data associated with the identified minority group value.

The beacon data received at the server may include data records associated with at least one of the one or more transmitters, with the beacon data received at the server excluding data corresponding to at least one other of the one or more transmitters, the excluded data being removed at the asset tag device based on the group values respectively associated with the one or more transmitters. Each of the one or more beacon signals received at the asset tag device may include a corresponding group value associated with a corresponding transmitter from which the respective each of the one or more beacons signals was transmitted.

The excluded data may be associated with an identified minority group value, with the minority group value identified from the group values respectively associated with the one or more transmitters. The minority group value may correspond to one of the group values associated with fewest number of transmitters from the one or more transmitters.

The method may further include dynamically generating, at the server, a plurality of group values associated with a plurality of transmitters, the plurality of transmitter including the one or more transmitters, and communicating to the plurality of transmitters the dynamically generated plurality of group values.

The beacon data may include data representative of measurements performed on at least one of the one or more beacon signals received at the asset tag devices.

The data representative of the measurements performed on the at least one of the one or more beacon signals may include measurements of signal strength of the at least one of the one or more beacon signals, with the signal strength used to determine a received signal strength indication (RSSI) for the at least one of the one or more beacon signals.

In some variations, a server is disclosed that includes one or more processors and storage media comprising computer instructions. The computer instruction, when executed on the one or more processors, cause operations including receiving beacon data indicative of a location of an asset tag device, the beacon data determined based on one or more beacon signals received at the asset tag device from one or more transmitters that is each associated with a respective one of group values identifying a corresponding one of a plurality of assigned transmitter groups comprising the respective each of the one or more transmitters. The computer instructions also cause operations including determining the location of asset tag device based on the beacon data received at the server from the asset tag device and on the group values respectively associated with the one or more transmitters from which the one or more beacon signals received at the asset tag device were transmitted.

Embodiments of the server may include at least some of the features described in the present disclosure, including at least some of the features described above in relation to the method.

In some variations, an asset tag device is disclosed that includes one or more processors and storage media comprising computer instructions. The computer instructions, when executed on the one or more processors, cause operations including receiving beacon signals from one or more transmitters that are each associated with a respective one of group values identifying a corresponding one of a plurality of assigned transmitter groups comprising the respective each of the one or more transmitters. The computer instructions further cause operations including transmitting to a server beacon data indicative of a location of the asset tag device, the beacon data determined based on one or more of the beacon signals. The location of asset tag device is determined at the server based on the beacon data transmitted from the asset tag device and on the group values respectively associated with the one or more transmitters from which the one or more beacon signals were received at the asset tag device.

Embodiments of the wireless device may include at least some of the features described in the present disclosure, including at least some of the features described above in relation to the method and/or the server, as well as one or more of the following features.

Transmitting to the server the beacon data may include excluding data corresponding to at least one of the one or more transmitters based on the group values respectively associated with the one or more transmitters, and transmitting to the server data corresponding to at least one other transmitter of the one or more transmitters.

Excluding the data corresponding to the at least one of the one or more transmitters may include identifying from the group values respectively associated with the one or more transmitters a minority group value associated with a fewest number of transmitters from the one or more transmitters, and excluding the data corresponding to the at least one of the one or more transmitters associated with the identified minority group value.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Other and further objects, features, aspects, and advantages of the present disclosure will become better understood with the following detailed description of the accompanying drawings.

BRIEF DESCRIPTION OF THE DRAWING

Like reference symbols in the various drawings indicate like elements.

DESCRIPTION

Figure 1:
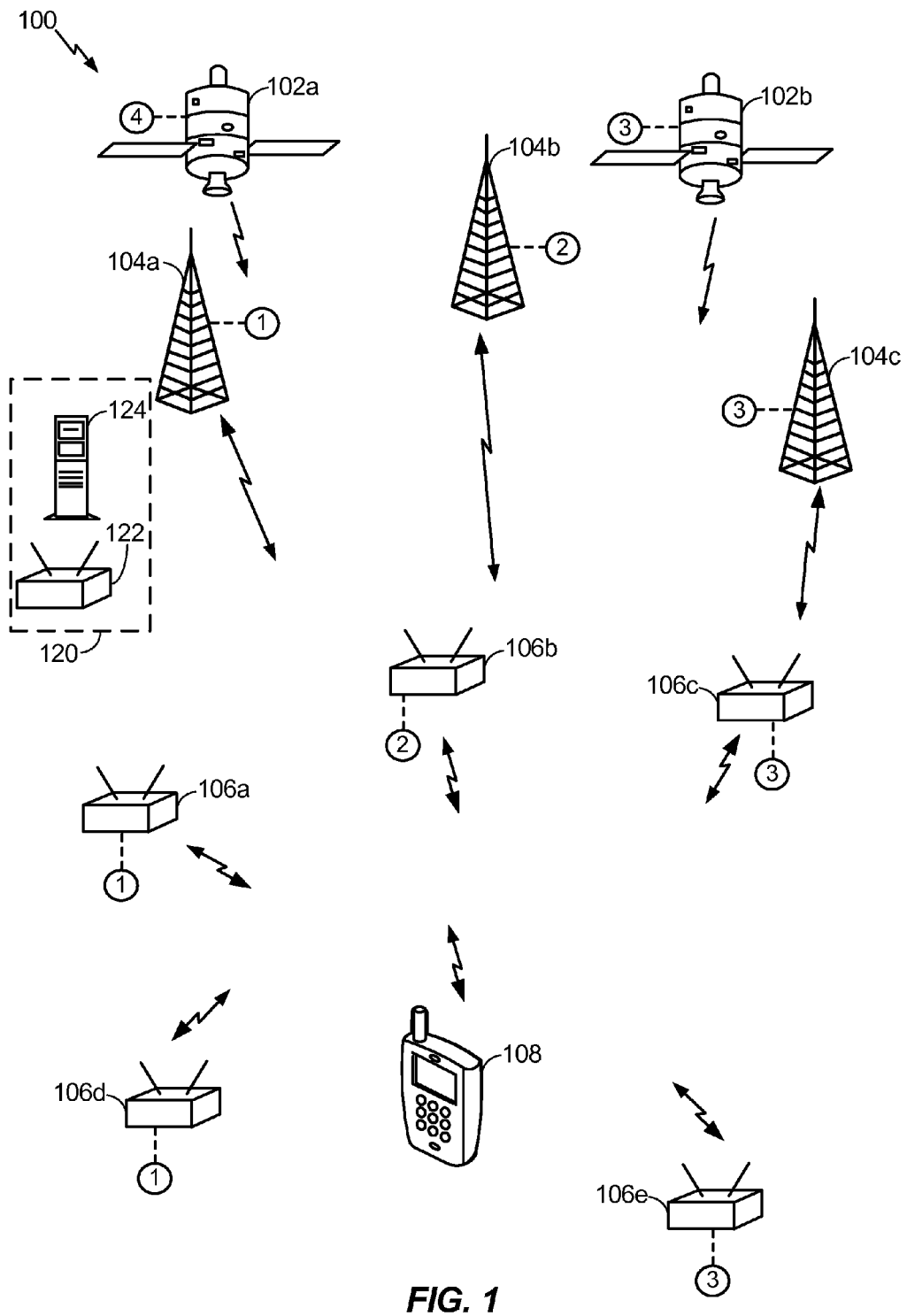
FIG. 1 is a schematic diagram of an example operating environment in which a mobile device, such as an asset tag device, may operate.

Described herein are systems, apparatus, devices, methods, products, media, and other implementations to perform location determination based on group information assigned to beacons (i.e., transmitters configured to transmit, among other things, beacon signals) so that their deployments are grouped. Grouping could be based on multiple criteria including geographical location, work team assignment, or other constraining information. Also, group information can be generated by a backend server, pre-configured on the beacon transmitters, or combination of both (generated at the server and then disseminated to the beacons in the field). The group information can help improve accuracy of location determination processes (also referred to as "locationing"), asset tag transmission efficiency of useful information, and overall bandwidth utilization of the deployed system.

In some implementations of asset tracking and asset location determinations, transmitters broadcast periodically their MAC address. An asset tag device (attached or positioned near the asset to be tracked) performs periodical beacon scans, and measures the beacon signals' signal strength (from which an RSSI value may be derived). The asset tag device then transmits periodically data records (e.g., up to a predetermined maximum number of tuples, such as six tuples) that each includes, for example, a sequence number, beacon MAC address, and Beacon RSSI value. This data (also referred to as beacon data or location data) can be used to infer at the server the location of the asset tag device.

In determining the location of the asset tag device, the server may select only a subset of the received data, e.g., the data records that include the largest RSSI values. However, in some situations, the data records with the largest RSSI values do not necessarily correspond to the transmitters closest to the asset tag device, which in turn may result in the server inferring the wrong location (approximate or exact). To remedy this problem, group information associated with the transmitters may be determined to enable exclusion of beacon data from transmitters assigned to transmitter groups that are farther away from the asset tag device than those transmitters whose associated beacon data is not excluded.

Thus, the implementations described herein include a method including receiving (e.g., at a server) beacon data indicative of a location of an asset tag device, the beacon data determined based on one or more beacon signals received at the asset tag device from one or more transmitters that is each associated with a respective one of group values identifying a corresponding one of a plurality of assigned transmitter groups comprising the respective each of the one or more transmitters. The method also includes determining (e.g., at the server) the location of asset tag device based on the beacon data received at the server from the asset tag device and on the group values respectively associated with the one or more transmitters from which the one or more beacon signals received at the asset tag device were transmitted.

With reference to FIG. 1, shown is a schematic diagram of an example operating environment 100 in which an asset tag device 108 (also referred to as a tracking device), which may be associated with an asset to be tracked (e.g., a package, a vehicle, a machine, an inventory item, etc.) operates. The asset tag device 108 may be configured to receive signals from one or more transmitters, and to transmit data to a remote node 120 (e.g., a node comprising a server, such as a server 124 depicted in FIG. 1, that is coupled to a transceiver, such as a access point/transceiver 122, which may be one of the transceivers from which the asset tag device 108 received signals, or a different transceiver). Based on the data transmitted to the remote node 120, the location of the asset tag device, and thus of the asset associated with the tag, may be determined. In some embodiments, and as will be discussed in greater detail below, the data that the asset tag device transmits to the remote node 120 includes beacon data, indicative of the location of the asset tag device, that was determined based on beacon signals transmitted from transmitters that are each associated with a respective group value identifying a corresponding one of a plurality of transmitter groups into which the respective each of the transmitters was assigned.

The asset tag device 108 (which may also be referred to herein as a wireless device, a mobile station, or a tracking device) may be configured, in some embodiments, to operate and interact with multiple types of other communication systems/devices, including local area network devices (or nodes), such as WLAN for indoor communication, femtocells, Bluetooth® wireless technology transceivers, and other types of indoor communication network nodes, wide area wireless network nodes, satellite communication systems, etc., and as such the asset tag device 108 may include one or more interfaces to communicate with the various types of communications systems. As used herein, communication systems/devices/nodes with which the mobile device 108 may communicate are also referred to as access points (AP's).

As noted, the environment 100 may contain one or more different types of wireless communication systems or nodes. Such nodes, also referred to as wireless access points (or WAPs) may include LAN and/or WAN wireless transceivers, including, for example, WiFi base stations, femto cell transceivers, Bluetooth® wireless technology transceivers, cellular base stations, WiMax transceivers, etc. Thus, for example, and with continued reference to FIG. 1, the environment 100 may include Local Area Network Wireless Access Points (LAN-WAPs) 106a-e that may be used to implement, among other things, wireless voice and/or data communication with the asset tag device 108 (e.g., in implementations in which the asset tag device 108 is a mobile phone). The LAN-WAPs 106a-e are utilized, in some embodiments, to facilitate tracking functionality with respect to the asset tag device 108, and/or to serve as independent sources of position data based on which the location of the device 108 may be determined, e.g., through fingerprinting-based procedures, through implementation of multilateration-based procedures based, for example, on timing-based techniques (e.g., RTT-based techniques, etc.). The LAN-WAPs 106a-e can be part of a Wireless Local Area Network (WLAN), which may operate in buildings and perform communications over smaller geographic regions than a WWAN. Additionally in some embodiments, the LAN-WAPs 106a-e could also be pico or femto cells. In some embodiments, the LAN-WAPs 106a-e may be part of, for example, WiFi networks (802.11x), cellular piconets and/or femtocells, Bluetooth® wireless technology networks, etc. The LAN-WAPs 106a-e can also implement a Qualcomm indoor positioning system (QUIPS). A QUIPS implementation may, in some embodiments, be configured so that a mobile device can communicate with a server that provides the device with data (such as to provide the assistance data, e.g., floor plans, AP MAC IDs, RSSI maps, etc.) for a particular floor or some other region where the mobile device is located. Although five (5) LAN-WAP access points are depicted in FIG. 1, any number of such LAN-WAP's may be used, and, in some embodiments, the environment 100 may include no LAN-WAPs access points at all, or may include a single LAN-WAP access point.

As further shown in FIG. 1, the environment 100 may also include a plurality of one or more types of Wide Area Network Wireless Access Points (WAN-WAPs) 104a-c, which may be used for wireless voice and/or data communication, and may also serve as another source of independent information through which the mobile device 108 may determine its position/location. In some embodiments, one or more of the WAN-WAPs 104a-c may also be configured to transmit beacon signals that include data identifying the nodes transmitting those beacons (e.g., the nodes' MAC address, node's name, etc. Such beacon signals are received by the device 108, which is configured to process/analyze the received beacon signals. For example, when the beacon signals include group information corresponding to the beacon signals, the asset tag device 108 may be configured to filter the signals to exclude/remove at least some of the received beacon signals based on their respective group information.

The WAN-WAPs 104a-c may be part of wide area wireless network (WWAN), which may include cellular base stations, and/or other wide area wireless systems, such as, for example, WiMAX (e.g., 802.16). A WWAN may include other known network components which are not shown in FIG. 1. Typically, each WAN-WAPs 104a-104c within the WWAN may operate from fixed positions or may be moveable nodes, and may provide network coverage over large metropolitan and/or regional areas. Although three (3) WAN-WAPs are depicted in FIG. 1, any number of such WAN-WAPs may be used. In some embodiments, the environment 100 may include no WAN-WAPs at all, or may include a single WAN-WAP.

In some embodiments, communication to and from the asset tag device 108 (which may be realized using a mobile communication device) to, for example, exchange data, may be implemented using various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be implemented, at least in part, using an IEEE 802.11x network, and a WPAN may be a Bluetooth® wireless technology network, an IEEE 802.15x, or some other type of network. The techniques described herein may also be used for any combination of WWAN, WLAN and/or WPAN.

In some embodiments, and as further depicted in FIG. 1, the device 108 may also be configured to at least receive information from a Satellite Positioning System (SPS) 102a-b, which may be used as an independent source of position information for the mobile device 108. The mobile device 108 may thus include one or more dedicated SPS receivers specifically designed to receive signals for deriving geo-location information from the SPS satellites. Thus, in some embodiments, the asset tag device 108 may communicate with any one or a combination of the SPS satellites 102a-b, the WAN-WAPs 104a-c, and/or the LAN-WAPs 106a-e. In some embodiments, each of the aforementioned systems can provide an independent information estimate of the position for the mobile device 108 using different techniques. In some embodiments, the device 108 may combine the solutions derived from each of the different types of access points to improve the accuracy of the position data. It is also possible to hybridize measurements from different systems to get a position estimate (e.g., computed, for example, at the server 124 of the node 120), particularly when there is an insufficient number of measurements from all individual systems to derive a position. For instance, in an urban canyon setting, only one GNSS satellite may be visible and provide decent measurements (i.e. raw pseudorange and Doppler observables). By itself, this single measurement cannot provide a position solution. However, it could be combined with measurements from urban WiFi AP's, or WWAN cell ranges. When deriving a position using the access points 104a-b, 106a-e, and/or the satellites 102a-b, at least some of the operations/processing may be performed using a positioning server 110 which may be accessed, in some embodiments, via a network 112.

In embodiments in which the asset tag device 108 can receive satellite signals, the mobile device may utilize a receiver (e.g., a GNSS receiver) specifically implemented for use with the SPS to extract position data from a plurality of signals transmitted by SPS satellites 102a-b. Transmitted satellite signals may include, for example, signals marked with a repeating pseudo-random noise (PN) code of a set number of chips and may be located on ground based control stations, user equipment and/or space vehicles.

The techniques provided herein may be applied to or otherwise enabled for use in various other systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

As used herein, an asset tag device, or a mobile device or station (MS), refers to a device such as a cellular or other wireless communication device, personal communication system (PCS) device, personal navigation device (PND), Personal Information Manager (PIM), Personal Digital Assistant (PDA), a tablet device, a laptop, recreational navigational-capable sporting devices (e.g., a jogging/cycling equipped with a GPS and/or WiFI receiver), or some other suitable mobile device which may be capable of receiving wireless communication and/or navigation signals, such as navigation positioning signals. The term "mobile station" (or "mobile device") is also intended to include devices which communicate with a personal navigation device (PND), such as by short-range wireless (e.g., Bluetooth® wireless technology), infrared, wireline connection, or other connection, regardless of whether satellite signal reception, assistance data reception, and/or position-related processing occurs at the device or at the PND. Also, "mobile station" is intended to include all devices, including wireless communication devices, computers, laptops, tablet, etc., which are capable of communication with a server, such as via the Internet, WiFi, or other network, regardless of whether satellite signal reception, assistance data reception, and/or position-related processing occurs at the device, at a server, or at another device associated with the network. Any operable combination of the above are also considered a "mobile station." Although FIG. 1 depicts the asset tag device 108 as a mobile phone device, the asset tag device may, as noted, include in some implementations, other types of devices which may configured for more specific tasks (e.g., navigation or tracking tasks) without necessarily enabling voice communication or elaborate data processing applications.

As noted, one or more of the transmitters/nodes depicted in FIG. 1, including the LAN-WAP nodes 106a-e, and the WAN-WAP nodes 104a-c (and in some embodiments, also the satellites 102a-b) may be assigned group values (assignable from a plurality of group values) indicative of deployment characteristic associated with the nodes. For example, the grouping of the nodes 104a-c and 106a-e (and possibly 102a-b) may be based on such criteria as the nodes' geographical locations, work-team assignment, transceiver type, and/or other deployment criteria. In the example of FIG. 1, the various nodes illustrated as being grouped according to geographical positioning, with the nodes (access points) 104a, 106a and 106d being assigned to (or associated with) group '1' (corresponding to a first geographical region/area), the nodes 104b and 106b assigned to, or associated with, group '2' (corresponding to a second geographic region/area), and the nodes 104c, 106c and 106e being assigned to, or associated with, group '3' (corresponding to a third geographic region/area). In the example of FIG. 1, the satellite 102a is assigned to a fourth group (group '4'), and the satellite 102b is assigned to the group '3'. Location of the asset tag device 108 (be it an approximation or more precise location determination) may then be determined/derived based, at least in part, on the group values assigned to the transmitters/nodes from which the beacon signals are received by the device 108.

Figure 2:
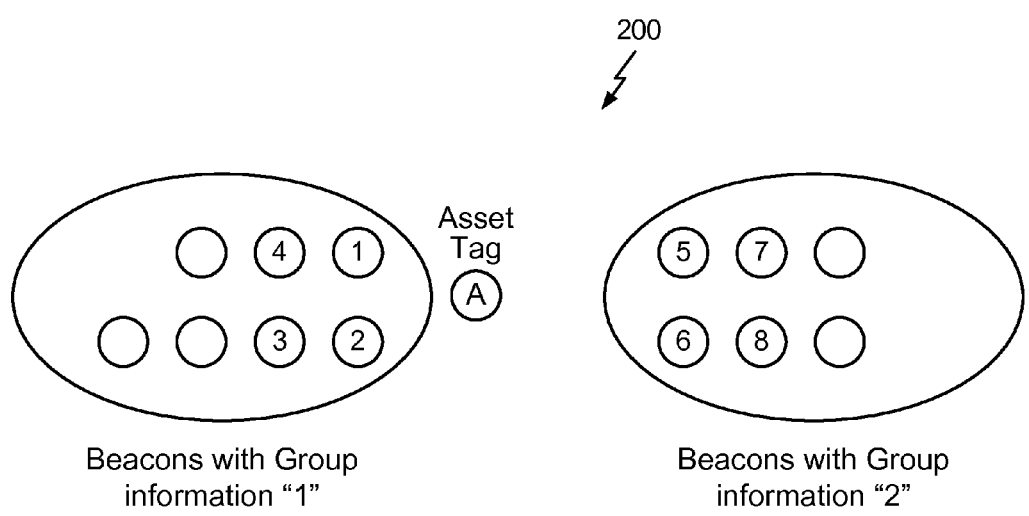
FIG. 2 is a schematic diagram of an example system with transmitters assigned group values.

For example, FIG. 2 is a schematic diagram of an example system 200 with transmitters assigned group values that can be used to determine a location estimate for a device such as asset tag device A. Assume, for this example, that at time t, tag device A receives beacon signals from transmitters 1, 2, 3, 4, and 7, and that the signal of transmitter 7 is the strongest (e.g., possibly because of line-of-sight conditions that resulted in the signal received from the beacon transmitter 7 being the strongest, and/or because transmitter 7 broadcasts at a higher transmission power than the transmitters of group 1). Ordering, based on signal strength or RSSI, the beacon data to be used for location determination of the tag device A may result in an example order of <7, 1, 2, 3, and 4>. Without group information, the tag device A would be considered to be closest to beacon transmitter 7 and 1. However, with group information, a majority vote may filter out (exclude) the data associated with beacon transmitter 7 as noise, and the tag device A will be deemed to be closest to beacon transmitters 1 and 2, thus resulting in a more accurate approximation of the location of the tag device A.

In some embodiments, the transmitters/nodes may be configured remotely to associate them with their respective group assignment (e.g., dynamic group assignment, that can be changed periodically), or may be assigned their respective group assignment at the time of manufacturing or deployment (e.g., static group assignment), which generally is more permanent in nature (although can be changed if needed). In such embodiments, the nodes/transmitters/access points are configured to transmit their associated assigned group number with beacon signals that are used to facilitate location determination and/or tracking functionality (the group information may be transmitted with signals used for location determination or tracking, but may not be transmitted when those nodes/transmitters/access points are transmitting, for example, voice and/or data communication signals). In some embodiments, the group values may not be provided to the deployed transmitters/nodes, but rather are dynamically assigned and maintained at a server, e.g., the server 124 of the node 120 illustrated in FIG. 1. In such embodiments, upon the node 120 receiving data indicative of the location of the asset tag device 108 (e.g., identity of the nodes from which the asset tag device received beacon signals and/or information indicative of the received signal strength of those beacon signals), location determination for the asset tag device is performed based, at least in part, on the identity of the beacon nodes and their respective assigned group values (which may be maintained at the server, such as the server of the node 120 of FIG. 1).

Figure 3:
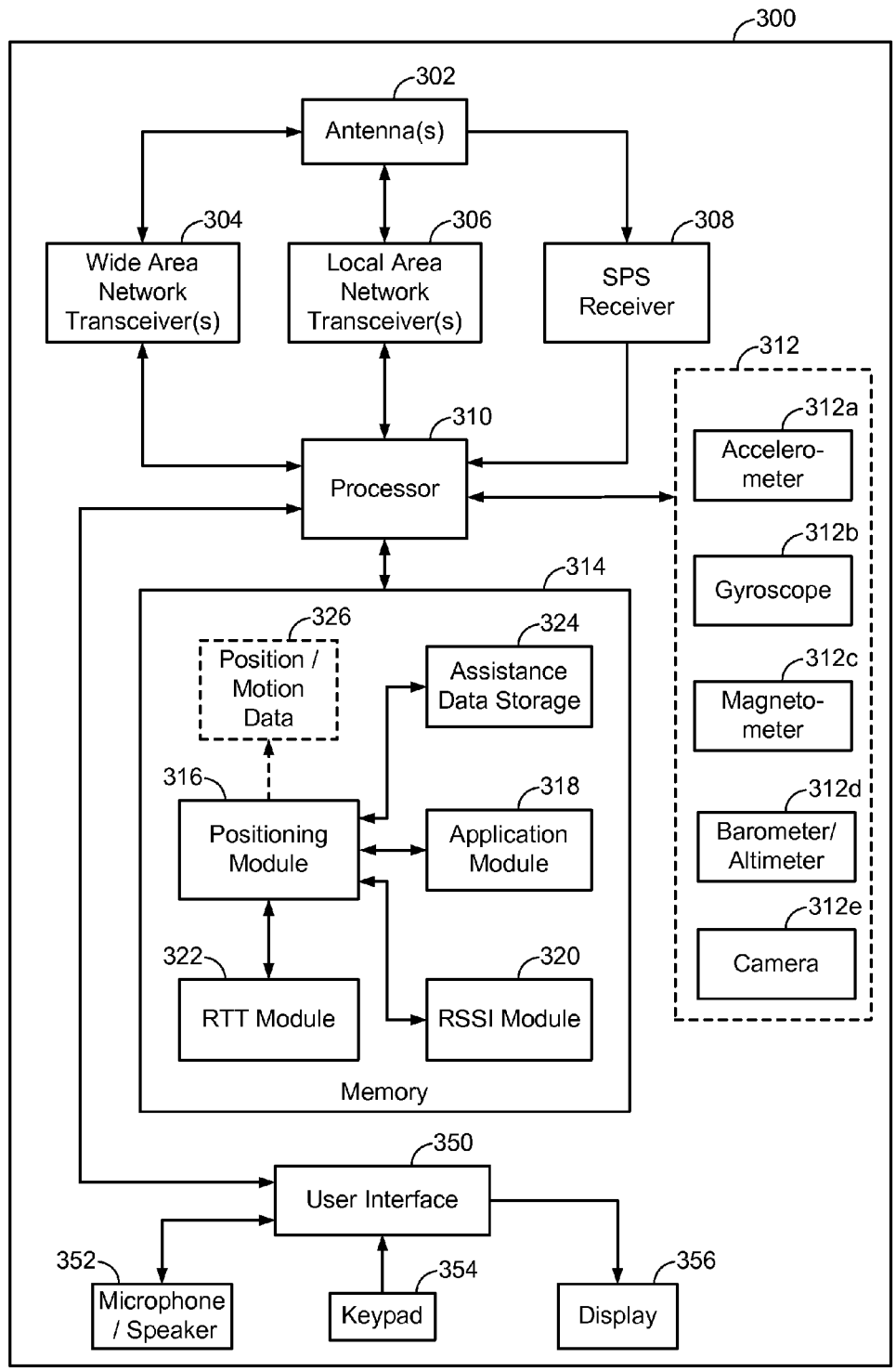
FIG. 3 is a schematic diagram of an example mobile device.

With reference now to FIG. 3, a schematic diagram illustrating various components of an example mobile device 300, which may be used to realize an asset tag device, and which may be similar to the asset tag device 108 of FIG. 1, is shown. For the sake of simplicity, the various features/components/functions illustrated in the box diagram of FIG. 3 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 3 may be further subdivided, or two or more of the features or functions illustrated in FIG. 3 may be combined. Additionally, one or more of the features or functions illustrated in FIG. 3 may be excluded.

As shown, the mobile device 300 may include one or more local area network transceivers 306 that may be connected to one or more antennas 302. The one or more local area network transceivers 306 comprise suitable devices, hardware, and/or software for communicating with and/or detecting signals to/from one or more of the LAN-WAPs 106a-e depicted in FIG. 1, and/or directly with other wireless devices within a network. In some embodiments, the local area network transceiver(s) 306 may comprise a WiFi (802.11x) communication transceiver suitable for communicating with one or more wireless access points; however, in some embodiments, the local area network transceiver(s) 306 may be configured to communicate with other types of local area networks, personal area networks (e.g., Bluetooth® wireless technology), etc. Additionally, any other type of wireless networking technologies may be used, for example, Ultra Wide Band, ZigBee, wireless USB, etc. In some embodiments, the unit 306 may be a receiver-only communication unit that can receive signals (e.g., to enable navigational functionality) but cannot transmit signals.

The mobile device 300 may also include, in some implementations, one or more wide area network transceiver(s) 304 that may be connected to the one or more antennas 302. The wide area network transceiver 304 may comprise suitable devices, hardware, and/or software for communicating with and/or detecting signals from one or more of, for example, the WAN-WAPs 104a-c illustrated in FIG. 1, and/or directly with other wireless devices within a network. In some implementations, the wide area network transceiver(s) 204 may comprise a CDMA communication system suitable for communicating with a CDMA network of wireless base stations. In some implementations, the wireless communication system may comprise other types of cellular telephony networks, such as, for example, TDMA, GSM, etc. Additionally, any other type of wireless networking technologies may be used, including, for example, WiMax (802.16), etc. In some embodiments, the unit 304 may be a receiver-only communication unit that can receive signals (e.g., to enable navigational functionality) but cannot transmit signals.

In some embodiments, an SPS receiver (also referred to as a global navigation satellite system (GNSS) receiver) 308 may also be included with the mobile device 300. The SPS receiver 308 may be connected to the one or more antennas 302 for receiving satellite signals. The SPS receiver 308 may comprise any suitable hardware and/or software for receiving and processing SPS signals. The SPS receiver 308 may request information as appropriate from the other systems, and may perform the computations necessary to determine the position of the mobile device 300 using, in part, measurements obtained by any suitable SPS procedure.

In some embodiments, the mobile device 300 may also include one or more sensors 312 coupled to a processor 310. For example, the sensors 312 may include motion sensors (also referred to as inertial sensors) to provide relative movement and/or orientation information which is independent of motion data derived from signals received by the wide area network transceiver(s) 304, the local area network transceiver(s) 306, and/or the SPS receiver 308. By way of example but not limitation, the motion sensors may include an accelerometer 312a, a gyroscope 312b, a geomagnetic (magnetometer) sensor 312c (e.g., a compass), an altimeter (e.g., a barometric pressure altimeter) 312d, and/or other sensor types. In some embodiments, the accelerometer 312a may be implemented based on micro-electro-mechanical-system (MEMS). Other types of accelerometers may be used in place of, or in addition to MEMS-based accelerometer. Additionally, a 3D accelerometer, sensitive to the accelerations along three orthogonal axes, may be implemented. In some embodiments, the gyroscope 312b may include a gyroscope based on MEMS technology, and may be a single-axis gyroscope, a double-axis gyroscope, or a 3-D gyroscope configured to sense motion about, for example, three orthogonal axes. Other types of gyroscopes may be used in place of, or in addition to a MEMS-based gyroscope. In some embodiments, a magnetometer, configured to measure a magnetic field intensity and/or direction (and, thus, may be configured to measure absolute orientation with respect to the local magnetic fields) may also be implemented based on MEMS technology. Such MEMS-based magnetometers may be configured to detect motion caused by the Lorentz force produced by a current through a MEMS conductor. Other types of magnetometers may also be used. An altimeter may, for example, be configured to provide altitude data and thus may facilitate determining, for example, a floor in an indoor structure (e.g., a shopping mall) where the device may be located. In some embodiments, absolute altitude may be available when a reference barometer, at a known nearby location (e.g., in the same building where the mobile device 300 is located) is available. When such a reference barometer is not available, a barometer can provide change of altitude information, which can be used in conjunction with information from inertial sensors (e.g., the accelerometer, gyroscope, etc.) to, for example, determine a position estimate.

The output of the one or more sensors 312 may be combined in order to provide motion information. For example, estimated position of the device 300 may be determined based on a previously determined position and the distance traveled from that previously determined position as determined from the motion information derived from measurements by at least one of the one or more sensors. In some embodiments, the estimated position of the mobile device may be determined based on probabilistic models (e.g., implemented through a particle filter, leveraging, for example, motion constraints established by venue floor plans, realized using the device 300) using the outputs of the one or more sensors 312. As further shown in FIG. 3, in some embodiments, the one or more sensors 312 may also include a camera 312e (e.g., a charge-couple device (CCD)-type camera), which may produce still or moving images (e.g., a video sequence) that may be displayed on a user interface device, such as a display or a screen.

The processor(s) (also referred to as a controller) 310 may be connected to the local area network transceiver(s) 306, the wide area network transceiver(s) 304, the SPS receiver 308, and/or the one or more sensors 312. The processor may include one or more microprocessors, microcontrollers, and/or digital signal processors that provide processing functions, as well as other calculation and control functionality. In some embodiments, a controller may be implemented without use of a processing-based device. The processor 310 may also include storage media (e.g., memory) 314 for storing data and software instructions for executing programmed functionality within the mobile device. The memory 314 may be on-board the processor 310 (e.g., within the same IC package), and/or the memory may be external memory to the processor and functionally coupled over a data bus. Further details regarding an example embodiment of a processor or computation system, which may be similar to the processor 310, are provided below in relation to FIG. 12.

A number of software modules and data tables may reside in memory 314 and be utilized by the processor 310 in order to manage communications with remote devices/nodes (such as the various nodes depicted in FIG. 1), positioning determination functionality, tracking functionality and/or device control functionality. For example, the processor 310 may be configured, e.g., using software-based implementations, to enable receipt of beacon signals from one or more transmitters/nodes (such as any of the transmitters/nodes 104a-c and/or 106a-e depicted in FIG. 1), with each such received beacon signals being associated with a respective one of group values identifying a corresponding one of a plurality of assigned transmitter groups that include the respective each of the one or more transmitters. For example, a device such as the device 300 may receive beacon signals from the transmitter 104a of FIG. 1 that is associated with group "1", the transmitter 106a that is also associated with group "1", and from the transmitter 106c that is associated with group "3". The processor 310 may further be configured to cause transmission (e.g., to a node such as the node 120 of FIG. 1) of beacon data indicative of a location of the device 300, with the beacon data determined based on one or more of the received beacon signals. In some situations, data corresponding to fewer than the received beacon signals may be transmitted to the server, while in some situations data corresponding to all of the beacon signals received during a particular interval may be transmitted to the server. A location of the asset tag device may be determined at the server based on the beacon data transmitted from the device 300 and based on the group values respectively associated with the one or more transmitters from which the one or more beacon signals were received at the asset tag device.

In some embodiments, the beacon data sent from a device, such as the device 300, to a server may include data records associated with at least one of the one or more transmitters from which beacon signals were received, and may exclude data corresponding to some of those one or more transmitters. Such excluded data may be removed at the asset tag device based on the group values respectively associated with the one or more transmitters. In other words, in such embodiments, the asset tag device filters the beacon signals to remove signals that may skew the location approximation/estimate for the asset tag device. For example, a particularly strong signal from a transmitter that is farther away from other transmitters whose respective beacon signals strength received at the asset tag device is weaker, may result in an inaccurate location estimate for the asset tag device if the asset tag device is configured to use only a limited number of beacon signals from those received to facilitate location determination (e.g., use only the five strongest signals of the received beacon signals). Thus, in such embodiments, the processor 310 may be configured to use only signals from particular groups by excluding signals from a transmitter group(s) with the fewest number of signals in the set of signals being processed. For example, if location determination is to be based only on ten (10) beacon signals, and eight (8) of the ten strongest signals received belong to a first transmitter group while two of the ten strongest signals belong to a second transmitter group, those two signals from the second transmitter group may be excluded for the purpose of location determination. In this example, the processor 310 may be configured to cause identification of the next two strongest beacon signals from the first group and to send those signals along with the 8 other signals from the first transmitter group. Alternatively, the processor 310 may be configured to cause only the first 8 signals from the first transmitter group to be sent to the server.

With continued reference to FIG. 3, memory 314 may include a positioning module 316, an application module 318, a received signal strength indicator (RSSI) module 320, and/or a round trip time (RTT) module 322. It is to be noted that the functionality of the modules and/or data structures may be combined, separated, and/or be structured in different ways depending upon the implementation of the mobile device 300. For example, the RSSI module 320 and/or the RTT module 322 may each be realized, at least partially, as a hardware-based implementation, and may thus include such devices as a dedicated antenna (e.g., a dedicated RTT and/or RSSI antenna), a dedicated processing unit to process and analyze signals received and/or transmitted via the antenna(s) (e.g., to determine signal strength of received signals, determine timing information in relation to an RTT cycle), etc.

The application module 318 may be a process running on the processor 310 of the device 300, which requests position information from the positioning module 316 (this module generally is implemented with personal-user mobile devices, such as mobile phones). Applications typically run within an upper layer of the software architectures, and may include indoor navigation applications, shopping applications, location-aware service applications, etc. In some embodiments, the positioning module 316 may derive the position of the mobile device 300 using information derived from various receivers and modules of the mobile device 300. In some embodiments, the positioning module may be configured to perform some of the operations to determine location of the device 300, such as to perform pre-filtering on the received beacon signals to exclude some of the signals (or their respective information) based on group information. Information pertaining to the non-excluded signals may be communicated to a remote device (e.g., a server such as the server 124 of FIG. 1) for further location determination processing.

Other information that may be determined from signals/communications received by the device 300 (e.g., using one of its transceivers) includes the received signal power, which may be represented in the form of RSSI (determined using the RSSI module 320). The RSSI module 320 may also provide data regarding the signals to the positioning module 316, which uses the signal strength information to perform at least some of the operations for location determination. For example, in embodiments in which the device 300 is used as asset tag device, RSSI measurements of received beacon signals (where each such beacon signal may be associated with a corresponding group value identifying/indicating the transmitter group to which the transmitter that transmitted the beacon signal belongs) may be used to order the beacon signals (e.g., strongest to weakest) and select a subset of the ordered signals for further location determination procedures (performed at the device 300, or at a remote server, such as the server 124 of the node 120 of FIG. 1). As noted, the subset may be determined based, at least in part, on group information associated with the beacon signals, in order to exclude RSSI measurements that may skew the results (because of an aberrant measurement related to environmental or signal path conditions). The RSSI measurements (for all the received beacon signals, or some subset thereof) may be used to, in part, facilitate location determination of the device 300 (e.g., based on fingerprinting location determination procedures, multilateration location determination procedures, etc.)

As further illustrated, the device 300 may also include assistance data storage 324 where assistance data may be stored, including data such as map information, data records relating to location information in an area where the device is currently located, group information, etc. Such data may be stored and used in implementation in which the device 300 is used as a personal-user mobile station (e.g., a personal GPS unit, a mobile phone, etc.) to enable location determination functionality. Such assistance data may have been downloaded from a remote server. In some embodiments, the device 300 may optionally also be configured to receive supplemental information that includes auxiliary position and/or motion data (depicted with dashed lines as box 326) which may be determined from other sources (e.g., the sensors 312). Such auxiliary position data may be incomplete or noisy, but may be useful as another source of independent information for estimating the processing times of the WAPs. Supplemental information may also include, but not be limited to, information that can be derived or based upon Bluetooth® wireless technology signals, beacons, RFID tags, and/or information derived from a map (e.g., receiving coordinates from a digital representation of a geographical map by, for example, a user interacting with a digital map).

The device 300 may further include a user interface 350 which provides a suitable interface system, such as a microphone/speaker 352, keypad 354, and a display 356 that allows user interaction with the mobile device 300. The microphone/speaker 352 provides for voice communication services (e.g., using the wide area network transceiver(s) 304 and/or the local area network transceiver(s) 306). The keypad 354 comprises suitable buttons for user input. The display 356 comprises a suitable display, such as, for example, a backlit LCD display, and may further include a touch screen display for additional user input modes.

Figure 4:
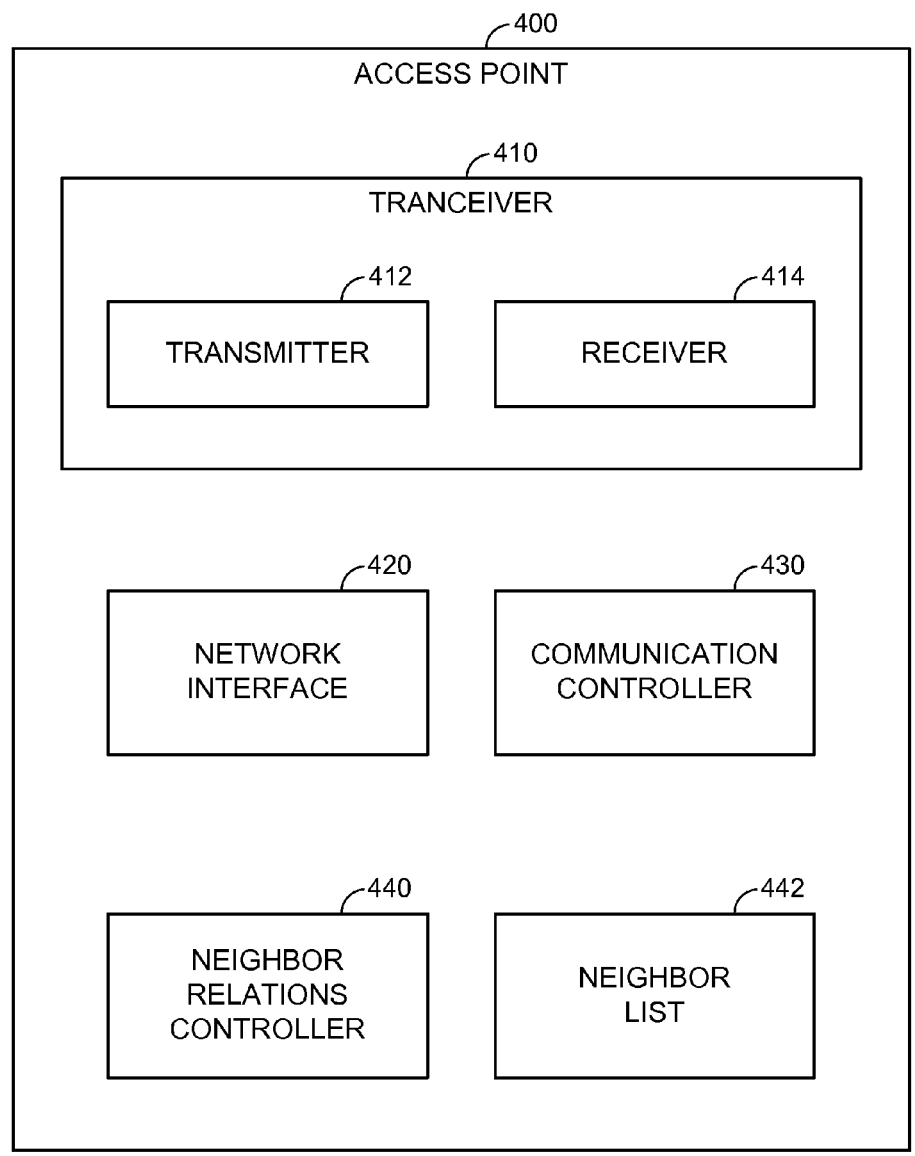
FIG. 4 is a schematic diagram of an example transmitter/node/access point.

With reference now to FIG. 4, a schematic diagram of an example node 400, which may be similar to, and be configured to have a functionality similar to that, of any of the access points/nodes 102a-b, 104a-c, or 106a-e, and/or the node 120 (which includes the access point 122 and the server 124) depicted in FIG. 1, is shown. The node 400 may include a transceiver 410 for communicating with wireless nodes, such as, for example, the devices 108 or 300 of FIGS. 1 and 3, respectively. The transceiver 410 may include a transmitter 412 for sending signals (e.g., downlink messages) and, in some embodiments, a receiver 414 for receiving signals (e.g., uplink messages). It is to be noted that when implementing tracking functionality to determine the approximate or exact location of an asset tag device, the beacon transmitters transmitting the beacon signals received by the asset tag device may not necessarily require signal receiving functionality (although one or more of such beacon transmitters may have signal receiving functionality). The access point/node 400 may include a network interface 420 to communicate with other network nodes (e.g., sending and receiving queries and responses). For example, each network element may be configured to communicate (e.g., wired or wireless backhaul communication) with a gateway, or other suitable entity of a network, to facilitate communication with one or more core network nodes. Additionally and/or alternatively, communication with other network nodes may also be performed using the transceiver 410.

Figure 5A:
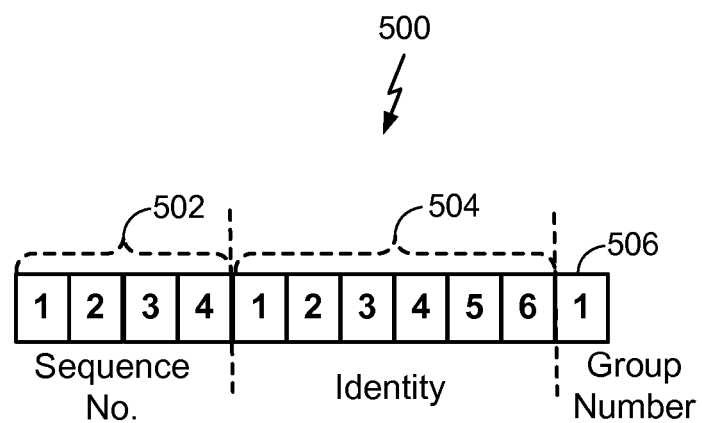
FIG. 5A is a schematic diagram of information included in an example beacon signal.

When the AP/node 400 is used to implement tracking functionality, the AP/node 400 is configured to transmit beacon signals (e.g., periodically at regular or irregular intervals, or in response to a request or instruction to transmit a beacon signal). FIG. 5A is a schematic diagram of an example of information included in an example beacon signal 500 (a beacon signal may also be referred to as a communication, control message, etc.) In the example of FIG. 5A, the beacon signal 500 includes a sequence number field 502, which, in some embodiments, may be four (4) bytes long. The sequence number may be used to avoid out-of-order reception of beacon packets from the same beacon transmitter, and also to have rough timekeeping of beacon packets from the same beacon transmitter. For example, if a packet with a sequence number of 160 is received after a packet with a sequence number of 140, then, assuming sequence numbers increase by 1, a receiving asset tag device can determine that approximately 20 time intervals have elapsed.

The example beacon signal 500 may also include an identity field 504 to hold information representative of the identity or address of the transmitter. For example, the field 504 (which may be, in some embodiments, 6 bytes long) may hold the transmitter's MAC address, or some other identifying information. In some embodiments, the beacon signal may include fields to hold multiple identifying/address information, including fields to hold service set identification (SSID) information (e.g., in implementations involving a WiFi-based transmitter), IP address information, etc.

As further shown in FIG. 5A, in some embodiments, the beacon signal 500 may also include a group number field 506 (which may be 1 byte, or larger if necessary) configured to hold a group value identifying one a plurality of transmitter groups in which the node transmitting the signal is assigned. As noted, the group value provides deployment information which may be used (e.g., by a receiving asset tag device or by a server configured to determine an asset tag device's location) to identify/determine aberrant data which may need to be excluded in order to derive a more accurate location approximation/estimate for the asset tag device that receives beacon signals from one or more nodes/transmitters. In some embodiments, the beacon signal 500 may not include group information, in which case the asset tag device or the server used to determine the asset tag device location may maintain records associating identifying information transmitted in a beacon signal (e.g., information such as the node's/transmitter's MAC address) in order to process beacon signals (and thus derive location information) based on group information. Further types of information and fields that may be included in the message 500 may also be used.

Turning back to FIG. 4, the transmitter/node 400 may also include other components that may be used in conjunction with embodiments described herein. For example, the node 400 may include, in some embodiments, a communication controller 430 to manage communications with other nodes (e.g., sending and receiving messages) and to provide other types of functionality. In addition, the transmitter/node 400 may include, in some embodiments, neighbor relations controllers (e.g., neighbor discovery modules) 440 to manage neighbor relations (e.g., maintaining a neighbor list 442) and to provide other related functionality. The communication controller may be implemented, in some embodiments, as a processor-based device, with a configuration and functionality similar to that shown and described in relation to FIG. 12.

Figure 6:
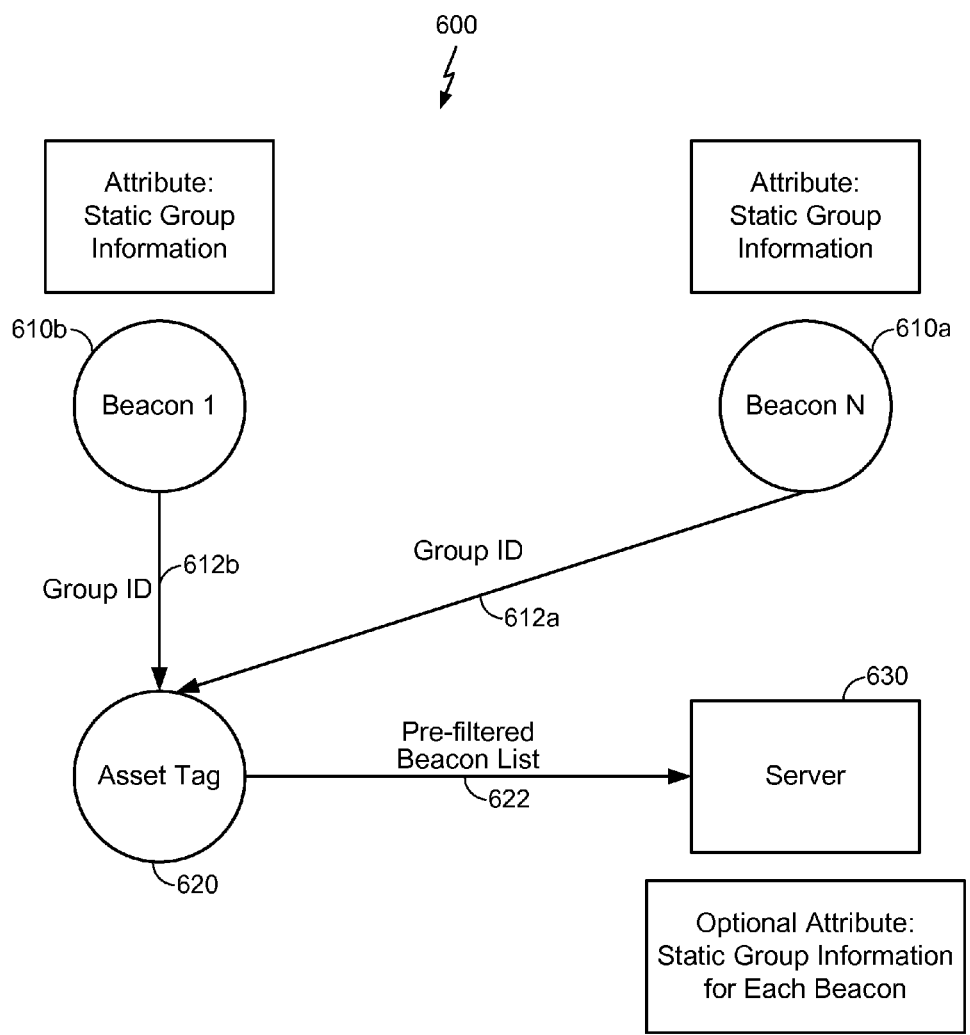
FIG. 6 is a schematic diagram of an example system to implement location determination of an asset tag device using group information.

The use of group information to perform location determination operations may be realized according to several different solutions of what information may be included and transmitted/received at each of a processing node (e.g., such as the node 120 that includes a server configured to, among other things, perform location determination processes), beacon transmitters/nodes, and an asset tag device. Thus, in a first solution, depicted in FIG. 6, an example system 600 includes one or more transmitters/nodes, such as transmitters 610a and 610b (which may be transmitting-only device, or may be implemented to perform multi-directional communications with other devices) that are assigned to fixed transmitter groups (e.g., at the time of manufacture or deployment). In some embodiments, the transmitters may be configured similar to, and include at least part of the functionality of, the example node 400 depicted in FIG. 4. In the embodiments of FIG. 6, data representative of the fixed (static) transmitter group(s) to which each of the transmitters 610a and 610b is assigned is included in beacon signals transmitted by the transmitters 610a-b (the transmitters' beacon signals are illustrated with arrows marked 612a and 612b, respectively). For example, the beacon signals may include information fields such as those illustrated in FIG. 5A. Although in the example system 600, illustrating the first solution for communicating and/or using group information, only two transmitters are depicted, the system 600 may include any number of transmitters to transmit beacon signals that facilitate location determination and/or tracking of mobile devices.

Figure 5B:
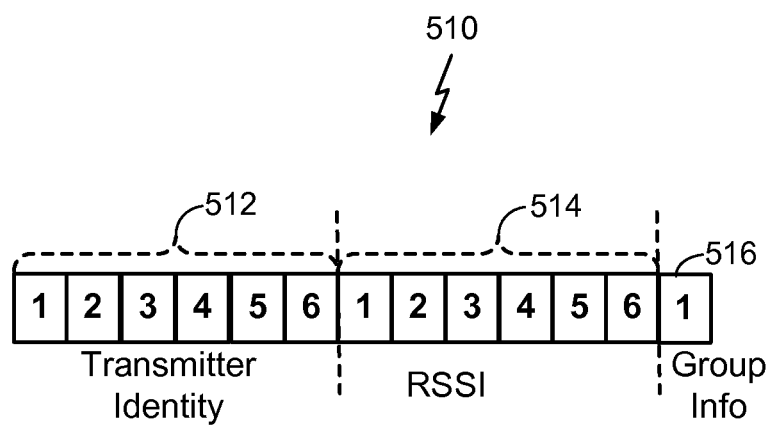
FIG. 5B is a schematic diagram an example data record that can be transmitted by an asset tag device.

As further shown in FIG. 6, the example system 600 includes a mobile device 620, such as an asset tag device. In some embodiments, the device 620 may be similar to, and be configured to perform similar operations as, the mobile devices 108 and 300 of FIGS. 1 and 3, respectively. More particularly, the device 620 may be configured to receive beacon signals from transmitters and/or to perform processing operations, on or in relation to the received beacon signals, based, at least in part, on group information that was transmitted with the beacon signals received by the device 620. For example, as noted, in some embodiments, the device 620 may receive during some interval beacon signals from one or more transmitters (such as the transmitters 610a and b) and measure the signals' strength to compute, for example, corresponding RSSI values. The device 620 may then order data records corresponding to the received signals according to their computed RSSI. The data records (or tuples) corresponding to the received signals may include such information as the RSSI (or some other representation of the signal strength), the identity of the transmitter from which the beacon signal was received, group value identifying the transmitter group to which the corresponding transmitter belongs, etc. For example, and with reference to FIG. 5B, an example data record 510 that may be transmitted by the device 620 to a server 630 may include a transmitter identity number field 512 (which may be, in some embodiments, 6 bytes long), and may hold the transmitter's MAC address, or some other identifying information. As further shown, the data record 510 may also include an RSSI field 514 holding data representative of the RSSI (or some other measure of signal strength) of the signal received by the device 620 from the transmitter corresponding to the record 500 (the field 514 is shown to be 6 bytes long, but may be of any size). The data record 510 also includes a group number field 516 (which may be 1 byte, or larger if necessary) configured to hold a group value identifying one a plurality of transmitter groups into which the transmitter/node (identified in the field 512) is assigned. In some embodiments, the data record 510 may not include group information, in which case the server 630 used to determine the asset tag device location may maintain records associating identifying information transmitted in the data record (e.g., information such as the transmitter's MAC address) in order to process beacon signals (and thus derive location information) based on group information. Further types of information and fields that may be included in the message 510 may also be used.

In some embodiments, the device 620 may also be configured, as part of the processing operations performed on or in relation to the beacon signals it received, to exclude (filter out) one or more of the data records based on the group information. For example, a group number associated with the fewest number of ordered data records (such group number is referred to as a minority group value) may be identified, and the records associated with that identified group value may be excluded so that they are not used at the device 620 to determine its location, and/or are not transmitted to a remote node that uses the transmitted information to determine the device 620's location. In some embodiments, excluded records are replaced with other data records (e.g., data records corresponding to the next strongest signals from transmitters associated with one or more group values corresponding to the non-excluded records). In some embodiments, no replacement records are added to the ordered list, and thus a smaller set of data records is communicated to a remote node (such as a node including a server 630). In embodiments in which the device 620 pre-filters the beacon signals and/or data records generated based on the received beacon signals, group information may not have to be included with the data (e.g., non-excluded data records) communicated to the server because the processing dependent on the group information has already been performed by the device 620 (namely, excluding data records and/or corresponding beacon signal information from transmitters associated with group values that are to be excluded).

As further shown, the example system 600 includes the server 630, which may be similar (in implementation and functionality) to the server 124 included in the node 120 in FIG. 1, and may be similar to, and be configured to perform at least some of the operations as, the node 400 of FIG. 4. The server 630 may or may not have the group information assigned to the transmitter, and is configured to use the pre-filtered list/data records provided by the asset tag device to determine or infer the asset tag device's location. For example, RSSI information and identity of the transmitters from which the beacon signals corresponding to the RSSI information communicated to the server may be used to perform multilateration computations to derive an approximate or substantially accurate position for the device 620.

Thus, in the first solution realized by the example system 600, each of the one or more beacon signals received at the device 620 includes a corresponding group value associated with a corresponding transmitter from which the respective each of the one or more beacons signals was transmitted, with those group values being statically assigned to the transmitters at the time of manufacture or deployment of the transmitted. Beacon data generated at the device 620 based on the received beacon signals and their associated group values (the beacon data is illustrated as arrow 622 in FIG. 6) is received at the server 630 and includes data records associated with at least one of the one or more transmitters, with the received beacon data excluding data corresponding to other of the one or more transmitters. The excluded data is removed at the device 620 based on the group values respectively associated with the one or more transmitters.

Figure 7:
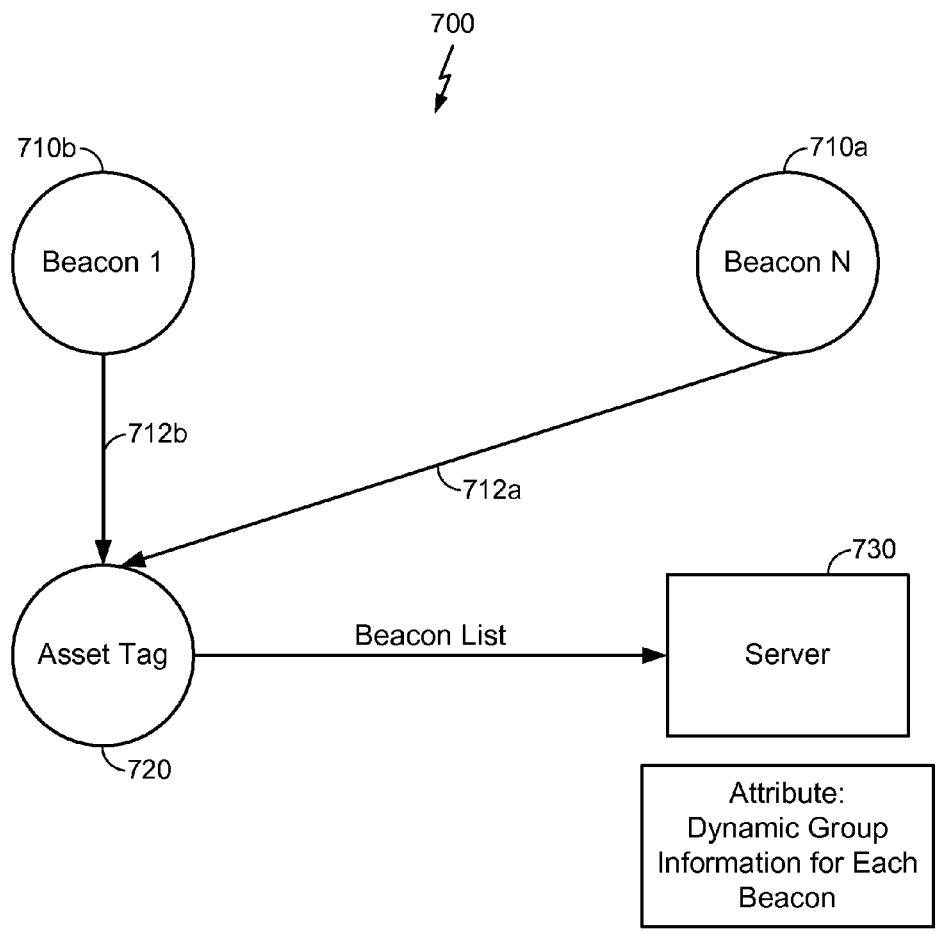
FIG. 7 is a schematic diagram of another example system to implement location determination of an asset tag device using group information.

In a second solution, depicted in FIG. 7, group information for the beacon transmitters is dynamically determined at the server, but not distributed to the transmitters. Transmitters/nodes/access points therefore transmit beacon signals without group information. The asset tag device generates beacon data corresponding to at least some (or all) of the beacon signals it has received without taking into account transmitters group information, and provides that information to the server (e.g., the asset tag device may provide beacon data corresponding to the top N beacon signals with the strongest RSSI). The server then uses the group information it generated, or otherwise maintains, to match it, for example, to MAC address information (or to some other transmitter-identifying information received with the beacon data from the asset tag device) to exclude at least some of the beacon data, and to infer/determine the asset tag device's location based on the non-excluded data.

More particularly, as shown, an example system 700 includes one or more transmitters/nodes, such as transmitters 710a and 710b (which may be similar to either of the transmitters 610a or 610b of FIG. 6, and may thus be transmitting-only device, or may be implemented to perform multi-directional communications with other devices). In the embodiments of FIG. 7, the transmitters 710a and 710b are not provided with group information. Rather, information about the transmitters' group assignment is maintained remotely at, for example, a server 730 that may also be used to derive the location of an asset tag device 720 based on location data that was generated based on beacon signals transmitted from the transmitters 710a-b and received by the asset tag device 720. In some embodiments, group assignment for the transmitters may be performed at some other node, and then communicated to the server 730 and/or directly to the transmitters. In the embodiments of FIG. 7, beacon signals 712a and 712b transmitted by the transmitters may include information identifying the transmitting nodes (e.g., MAC address, SSID information, etc.), but do not include group information such as the group information that was included with the beacon signals 612a and 612b of FIG. 6. Although in the example system 700, illustrating the second solution for using group information to facilitate location determination (exact or approximate) for an asset tag device, only two transmitters are depicted, the system 700 may include any number of transmitters to transmit beacon signals.

As further shown in FIG. 7, the example system 700 includes a mobile device 620, such as an asset tag device, which may be similar to, and be configured to perform at least some of the operations as, the mobile devices 108, 300, and/or 620 of FIGS. 1, 3, and 6, respectively. The device 720 is configured to receive beacon signals from transmitters/nodes/AP's and/or to perform processing operation on, or in relation to, the received beacon signals. For example, the device 720 may be configured to measure the signal strength of the received beacon signals (e.g., such as the signals 712a and 712b), and/or compute values representative of the signals' strength (e.g., such as RSSI values). In the embodiments of the example system 700, the device 720 may also be configured to communicate beacon data corresponding to at least some of beacon signals it received during some time interval to the server 730. Such beacon data may include data corresponding to the respective transmitters/nodes identity, data regarding the respective signal strength of the beacon signals, etc. Communicating the beacon data to the server 730 may include selecting information for transmission for a subset of the received beacon signals, e.g., selecting only the N strongest signals received during a particular time interval (such an interval may be any time interval such as 1 second, 5 seconds, 1 minute, etc.) The embodiments of FIG. 7 do not include pre-filtering of the information to be communicated to the server 730 based on group information.

The server 730 of the example system 700 depicted in FIG. 7 may be configured to implement at least part of the functionality of the server 124 included in the node 120 in FIG. 1, the node 400 of FIG. 4, or of the server 630 of FIG. 6. As noted, the server 730 maintains group assignment information for the transmitters/nodes 710a and 710b, and may also be configured to generate and/or dynamically adjust that information. For example, the server 730 may obtain (e.g., from the transmitters 710a-b, from one or more remote servers, not shown in FIG. 7, etc.) information relating to the deployment of the transmitters 710a and 710 (e.g., the geographical deployment of the transmitters). Based on the received deployment information, the server 730 may generate or adjust the group assignments for the transmitters 710a-b according to one or more proximity criteria. Such proximity criteria may be based on such grouping/deployment strategies as clustering, geofencing, floor map overlay, team ownership, etc. In some embodiments, if new transmitters have been added to the system 700, the various transmitters/nodes of the system 700 may be re-assigned to groups that better represent their geographical deployment (e.g., group a previously deployed first transmitter with a newly deployed transmitter that is geographical closer to the previously deployed transmitter than some other transmitter that was previously assigned to the same group as the first transmitter).

The server 730 is further configured to exclude at least some of the data received from the asset tag device 720 based on the group assignment maintained by the server 730. In some embodiments, the server 730 may determine the group assignment for each of the transmitters corresponding to beacon data the server 730 received from the device 720. For example, the server 730 may match MAC address information (and/or some other identifying information) included with the received beacon data to records maintained at the server 730 that include group assignment for each of the deployed transmitters (identified by their respective MAC addresses or other identifying information). Thus, in some embodiments, determining the location of asset tag device based on the beacon data received at the server from the asset tag device and on the group values may include identifying from the beacon data the one or more transmitters from which the beacon signals were transmitted, and determining from a plurality of data records stored at the server the group values respectively associated with the identified one or more transmitters.

In some embodiments, once the group assignments for the transmitters corresponding to the received beacon data are known, the group number or value associated with the fewest number of transmitters/nodes corresponding to the received beacon data is identified, and data (from the received beacon data) for the signals corresponding to the identified group number or value are excluded. Based on the remaining, non-excluded data, the server 730 is configured to determine or infer the asset tag device's location. For example, RSSI information and identity of the transmitters for the non-excluded beacon signals data is used to perform multilateration computations (or some other location determination process, such as RSSI fingerprinting) to derive an approximate or substantially accurate position for the asset tag device 720.

Figure 8:
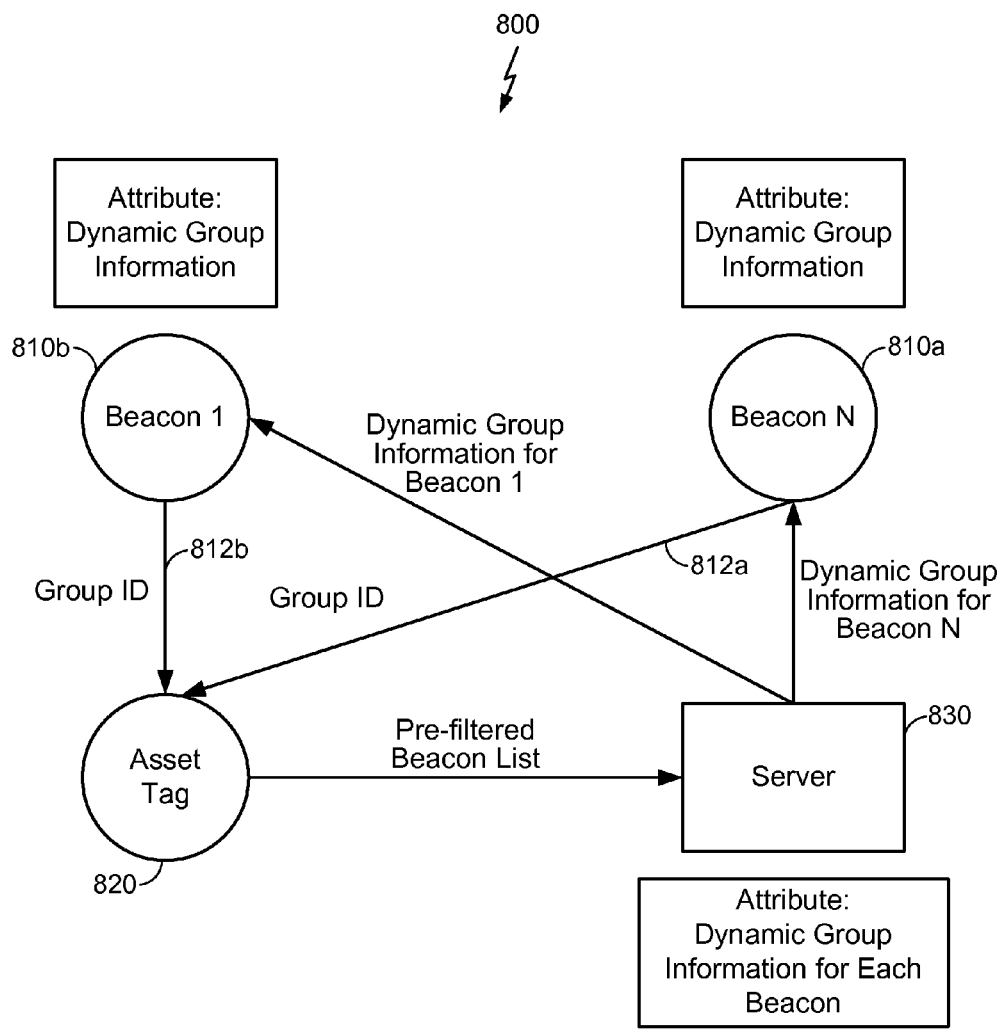
FIG. 8 is a schematic diagram of a further example system to implement location determination of an asset tag device using group information.

A third solution, depicted in FIG. 8, is similar to the first solution depicted in FIG. 6, except that group information for the beacon transmitters is dynamically determined at the server, and distributed to the transmitters/nodes. The transmitters/nodes transmit beacon signals that include the group information, and the asset tag device receives the beacon signals (with the corresponding group values). The asset tag device is configured to filter out data for at least one transmitter, when generating beacon data to be provided to the server, based on the group information included in the beacon signals. The asset tag device can therefore provide pre-filtered beacon data to the server (e.g., include beacon data corresponding to non-excluded beacon signals), and the server uses the pre-filtered data to determine or infer the asset tag device's location.

More particularly, an example system 800 includes one or more transmitters/nodes, such as transmitters 810a and 810b. The transmitters 810a and 810b are configured to receive (e.g., from the server 830 via a transceiver coupled to the server 730) a corresponding group value representative of an assignment of the transmitters to respective transmitter groups. Periodically, the transmitters 810a and 810b may receive new group assignments from the server 830 in response to a change in the deployment configurations or conditions of the transmitters. For example, in response to the addition or the removal of one or more transmitters, the group assignment may be adjusted, and the server 830 may transmit the new group values to the transmitters/nodes 810a and 810b.

In the embodiments of FIG. 8, data representative of the dynamically adjustable transmitter group(s) to which each of the transmitters 810a and 810b are assigned is included in beacon signals transmitted by the transmitters/nodes 810a-b (the transmitters' beacon signals are illustrated with arrows marked 812a and 812b, respectively). For example, the beacon signals may include information fields such as those illustrated in FIG. 5. Although in the example system 800 only two transmitters are depicted, the system 800 may include any number of transmitters to transmit beacon signals that facilitate location determination and/or tracking of mobile devices.

As further shown in FIG. 8, the example system 800 includes a mobile device 820, such as an asset tag device, which may be similar to, and configured to perform at least some of the operations as, the mobile devices 108, 300, 620, and 720 of FIGS. 1, 3, 6, and 7, respectively. More particularly, the device 820 is configured to receive beacon signals from transmitters and/or to perform processing operation on, or in relation to, the received beacon signals based, at least in part, on the dynamically adjustable group information that was transmitted with the beacon signals received by the device 820. In some embodiments, the device 820 may receive during some interval beacon signals from one or more transmitters (such as the transmitters 810a and 810b) and measure the signals' strength to compute, for example, corresponding RSSI values. The device 820 may then order data records corresponding to the received signals according to their computed RSSI. A data record corresponding to a received signal may include such information as the RSSI (or some other representation of the signal strength), the identity of the transmitter from which the beacon signal was received, group value identifying the transmitter group to which the corresponding transmitter belongs, etc. The device 820 may also be configured to exclude one or more of the data records based on the group information. For example, a group number associated with the fewest number of the ordered data records may be identified, and the records associated with that identified group value may be excluded so that they are not used at the device 820 to determine its location, and/or are not transmitted to a remote node (that includes the server 830) that uses the transmitted information to determine the device 820's location. In some embodiments, excluded records are replaced with other data records (e.g., data records corresponding to the next strongest signals from transmitters associated with one or more group values corresponding to the non-excluded records). In some embodiments, no replacement records are added to the ordered list, and thus a smaller set of data records is communicated to a remote node (such as a node including the server 830). In embodiments in which the asset tag device 820 pre-filters the beacon signals and/or data records generated based on the received beacon signals, group information may not have to be included with the data (e.g., non-excluded data records) communicated to the server because the processing dependent on the group information has already been performed by the device 820.

As noted, the example system 800 includes the server 830, which may be configured to maintain group assignment information for the system's transmitters/nodes (including for the transmitters 810a and 810b), and may also be configured to generate and/or dynamically adjust that group assignment information. For example, as with the server 730 of the system 700 of FIG. 7, based on deployment information received by the server 830, the server 830 may generate or adjust the group assignments for the transmitters/nodes 810a-b according to one or more proximity criterion. The server 830 is also configured to determine or infer the asset tag device's location. For example, RSSI information and identity of the transmitters for non-excluded beacon signals data may be used to perform location determination processes to derive an approximate or substantially accurate position for the asset tag device 820.

Figure 9:
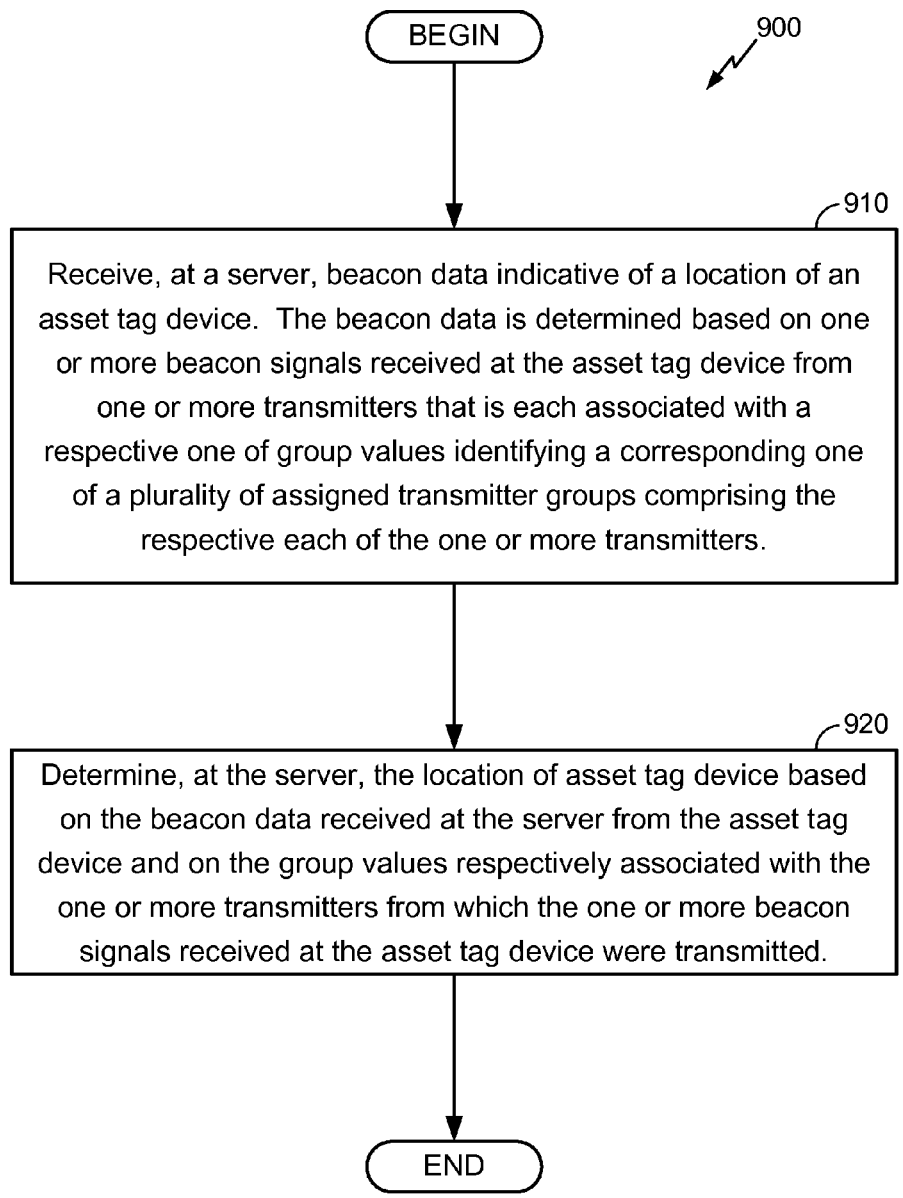
FIG. 9 is a flowchart of an example procedure, generally performed at a server receiving communications from an asset tag device, to implement location determination using group information.

With reference now to FIG. 9, a flowchart of an example procedure 900, generally performed at a server receiving communications from an asset tag device, to implement location determination using group information is shown. The procedure 900 includes receiving 910, at a server (such as any one of the server 124, 400, 630, 730, and 830 depicted in FIGS. 1, 4, 6, 7, and 8, respectively), beacon data indicative of a location of an asset tag device (such as any one of the devices 108, 300, 620, 720, or 720 depicted in FIGS. 1, 3, 6, 7, and 8, respectively). The beacon data is determined based on one or more beacon signals received at the asset tag device from one or more transmitters (e.g., any of the transmitters 104a-c, 106a-e, 610a-b, 710a-b, and 810a-b, depicted in FIGS. 1, 6, 7, and 8) that each associated with a respective one of group values identifying a corresponding one of a plurality of assigned transmitter groups comprising the respective each of the one or more transmitters. In some embodiments, the group values for the one or more transmitters (and/or for other transmitters from which the asset tag device does not necessarily receive beacon signals) are dynamically generated, at the server, and those generated group values are communicated to the various transmitters (e.g., as is done in the embodiments of the example system 800 illustrated in FIG. 8).

Based on the beacon data received at the server from the asset tag device and on the group values respectively associated with the one or more transmitters from which the one or more beacon signals received at the asset tag device were transmitted, the location of asset tag device is determined 920. In some embodiments, the location of asset tag device is determined by identifying from the beacon data the one or more transmitters from which the beacon signals were transmitted, and determining from a plurality of data records stored at the server the group values respectively associated with the identified one or more transmitters (as is done in the embodiments of the example system 700 of FIG. 7). In such embodiments, determining the group values includes matching information included in the received beacon data, identifying the one or more transmitters from which the beacon signals were transmitted, to respective one or more data records from the plurality of data records that include identifiers (e.g., MAC addresses, or some other identifying information) identifying the one or more transmitters. The determined group values respectively associated with the identified one or more transmitters may be used to exclude at least some of the beacon data, and the location of the asset tag device can thus be derived using only non-excluded beacon data.

In some embodiments, such as the embodiments illustrated by the example systems 600 or 800 of FIG. 6 or 8, respectively, the beacon data received at the server includes data records associated with at least one of the one or more transmitters, with the beacon data already excluding data corresponding to other of the one or more transmitters. In such embodiments, the excluded data was removed at the asset tag device based on the group values respectively associated with the one or more transmitters, with each of the one or more beacon signals received at the asset tag device includes a corresponding group value (e.g., statically assigned, as in the embodiments of FIG. 6, or dynamically generated and assigned, as in the embodiments of FIG. 8) associated with a corresponding transmitter from which the respective each of the one or more beacons signals was transmitted.

Figure 10:
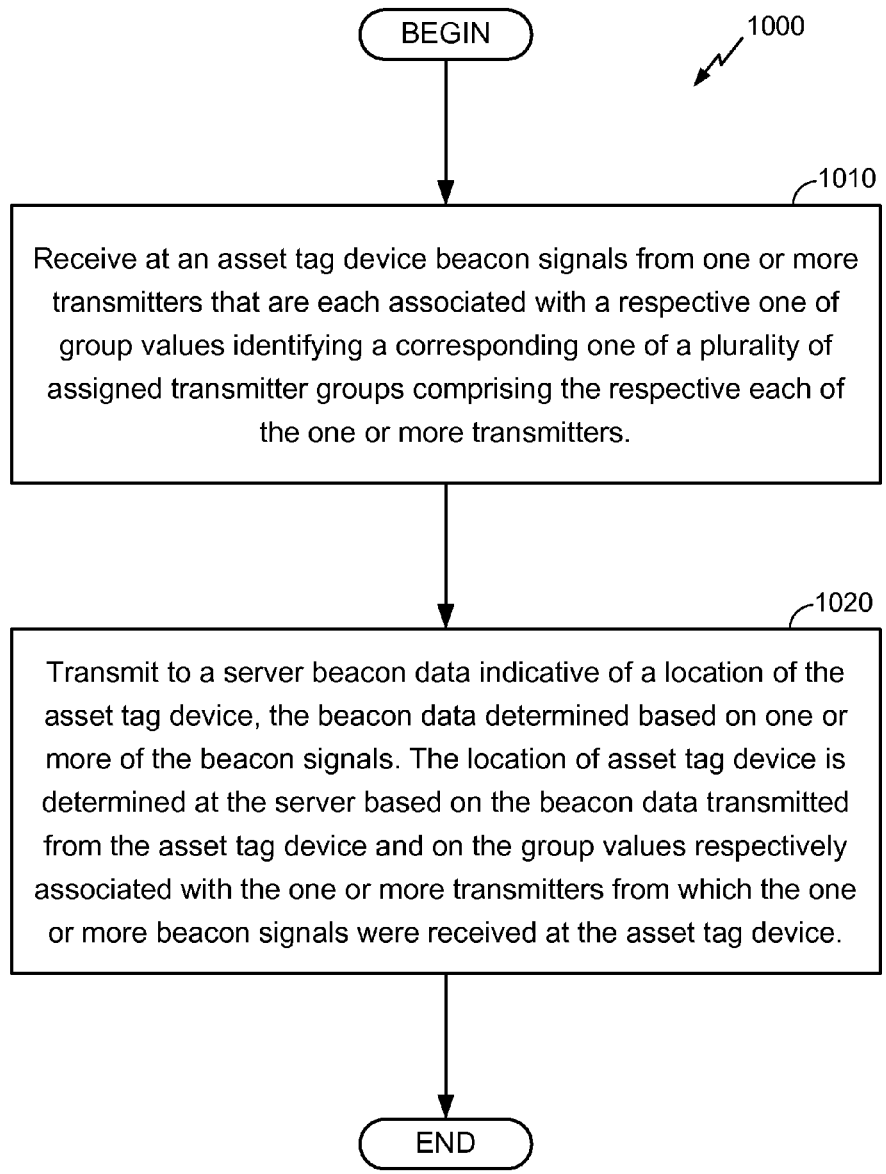
FIG. 10 is a flowchart of an example procedure, generally performed at an asset tag device, to implement location determination using group information.

With reference to FIG. 10, a flowchart of an example procedure 1000, generally performed at an asset tag device, to implement location determination using group information is shown. The procedure 1000 includes receiving 1010, at an asset tag device (such as any one of the devices 108, 300, 620, 720, or 730 depicted in FIGS. 1, 3, 6, 7, and 8, respectively) beacon signals from one or more transmitters that are each associated with a respective one of group values identifying a corresponding one of a plurality of assigned transmitter groups comprising the respective each of the one or more transmitters. In some embodiments, the group values may be provided to the transmitters, e.g., either static assignment, provided to the transmitters at the time of their manufacture or deployment, or dynamic assignment, provided to the transmitters periodically from a node/server (such as any one of the nodes/server 124, 400, 630, 730, and 830 depicted in FIGS. 1, 4, 6, 7, and 8, respectively) dynamically generating such group values and assignments. When the group values are provided to the transmitters/nodes, the group information may be included with the beacon signals (e.g., in beacon signals that include information such as that provided in the example information structure 500 of FIG. 5A). In some embodiments, the beacon signals do not include the group information (e.g., when the transmitters are not provided with such information, but rather, the group information associating the transmitters with group values is maintained at the server).

The example procedure 1000 also includes transmitting 1020 to the server beacon data indicative of a location of the asset tag device, with the beacon data determined based on one or more of the beacon signals. A location of the asset tag device is determined at the server based on the beacon data transmitted from the asset tag device and on the group values respectively associated with the one or more transmitters from which the one or more beacon signals were received at the asset tag device. As noted, in some embodiments (such as the embodiments, illustrated in FIGS. 6 and 8), the asset tag device performs pre-filtering of the beacon signals to exclude at least some of the information based on the group information it receives from the transmitters/nodes. For example, to exclude information for signals from far away transmitters that are stronger than some closer transmitters (and thus those signals from farther away transmitter might skew the location determination results), the group information may be used to determine that the strong signals belong to a distant transmitter group (or otherwise belong to a different group than the group including the majority of the N strongest signals received at the device). Such signals from the farther away group (which make a minority of the N strongest signals in this example) can thus be excluded (filtered out).

Figure 11:
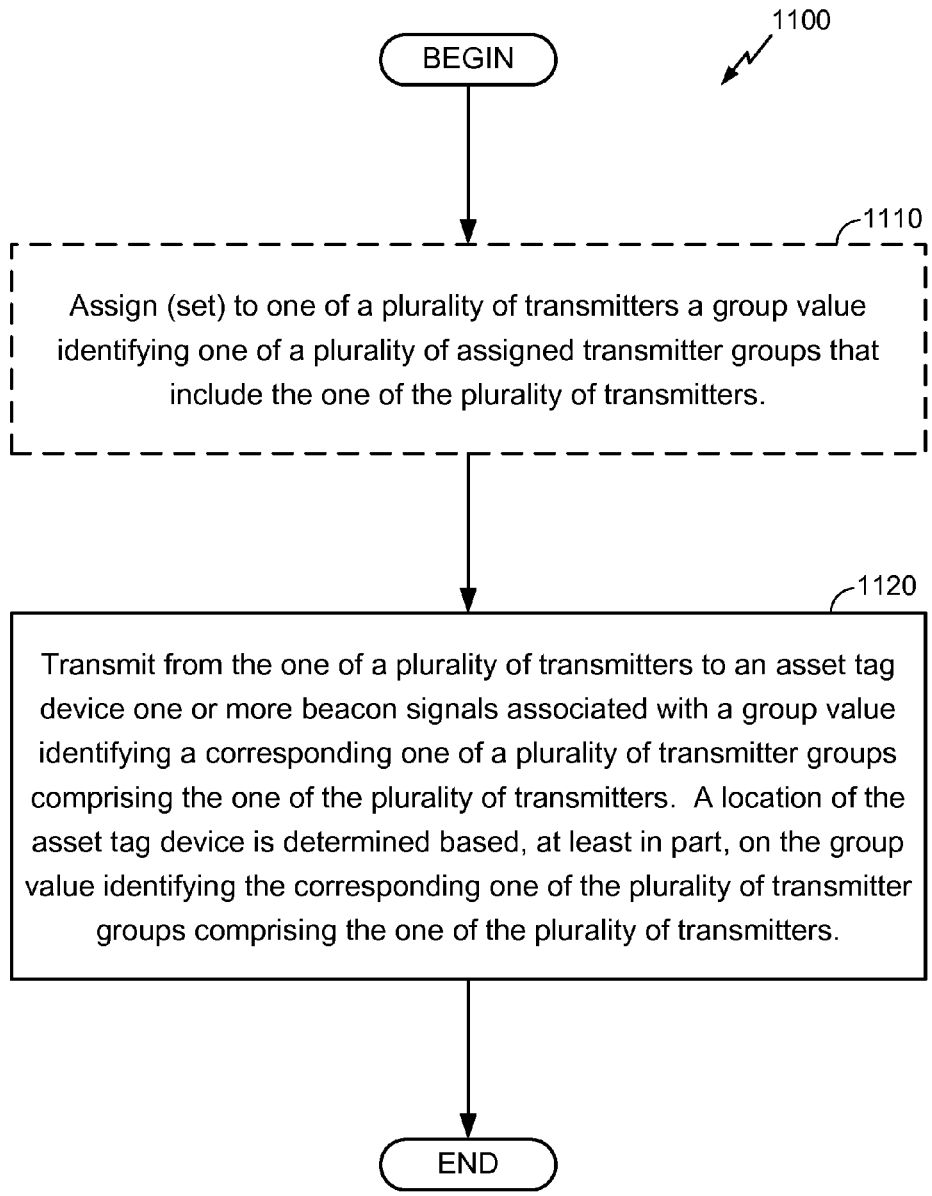
FIG. 11 is a flowchart of an example procedure, generally performed at a transmitter transmitting beacons to an asset tag device, to implement location determination using group information.

With reference to FIG. 11, a flowchart of an example procedure 1100, generally performed at a particular transmitter transmitting beacons to an asset tag device, to implement location determination using group information is shown. The procedure 1100 optionally includes assigning/setting 1110 a group value, identifying one of a plurality of assigned transmitter groups that includes the particular transmitter, to the particular transmitter. In some embodiments, the group value may be provided to the particular transmitter, e.g., a static assignment provided to the transmitter at the time of its manufacture or deployment, or dynamic assignment, provided to the transmitter periodically from a node/server (such as any one of the node/server 124, 400, 630, 730, and 830 depicted in FIGS. 1, 4, 6, 7, and 8, respectively) that dynamically performs group value assignments.

As further shown in FIG. 11, the procedure 1100 includes transmitting 1120 from the transmitter to an asset tag device beacon signals associated with the group value identifying the transmitter group that includes the particular transmitter. As described herein, a location of the asset tag device is determined based, at least in part, on the group value identifying the transmitter group that includes the particular transmitter. When the group value has been provided to the transmitter (e.g., in the optional operation 1110 depicted in FIG. 11), the group value information may be included with the beacon signals (e.g., in beacon signals that include information such as that provided in the example information structure 500 of FIG. 5A).

Figure 12:
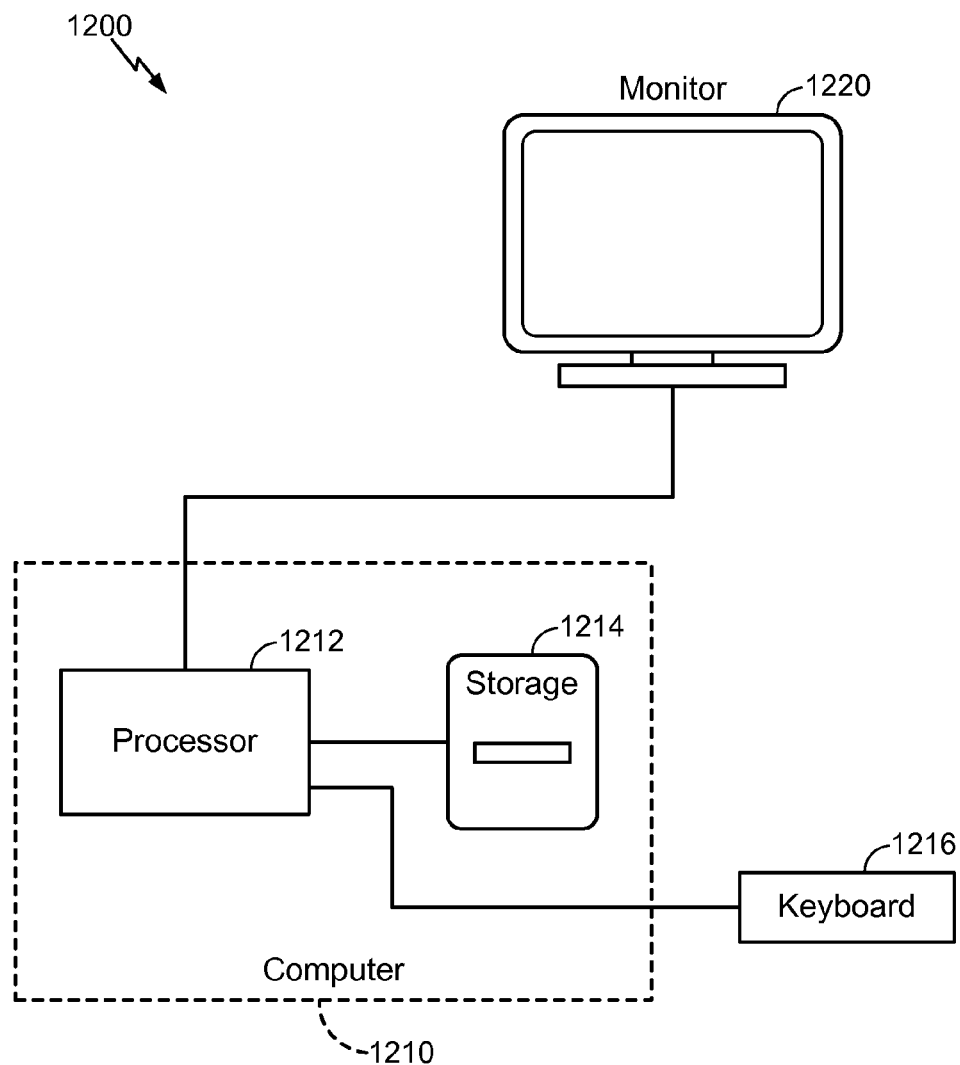
FIG. 12 is a schematic diagram of an example computing system.

Performing the procedures described herein, including the procedures to utilize transmitters'/nodes' group information to perform location determination operations, may be facilitated by a processor-based computing system. With reference to FIG. 12, a schematic diagram of an example computing system 1200 is shown. The computing system 1200 may be used to realize, for example, a device such as the devices 108, 300, 620, 720, and 820 of FIGS. 1, 3, 6, 7, and 8, respectively, a transmitter/node/AP, such any one of the transmitters/nodes/AP's 102a-b, 104a-c and 106a-e depicted in FIG. 1, or the transmitters/nodes 400, 610a-b, 710a-b, and 810a-b depicted in FIGS. 4, 6, 7, and 8, respectively, and/or a server/node such as any one of the servers 124, 630, 730, and 830 depicted in FIGS. 1, 6, 7, and 8, respectively. The computing system 1200 includes a processor-based device 1210 such as a personal computer, a specialized computing device, and so forth, that typically includes a central processor unit 1212. In addition to the CPU 1212, the system includes main memory, cache memory and bus interface circuits (not shown). The processor-based device 1210 may include a mass storage device 1214, such as a hard drive and/or a flash drive associated with the computer system. The computing system 1200 may further include a keyboard, or keypad, 1216, and a monitor 1220, e.g., a CRT (cathode ray tube) or LCD (liquid crystal display) monitor, that may be placed where a user can access them (e.g., a mobile device's screen).

The processor-based device 1210 is configured to, for example, implement the procedures described herein, including procedures to utilize transmitters' group information to, for example, implement location determination and/or tracking functionality (e.g., for an asset tag device). The mass storage device 1214 may thus include a computer program product that when executed on the processor-based device 1210 causes the processor-based device to perform operations to facilitate the implementation of the above-described procedures.

The processor-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), a DSP processor, or an ASIC (application-specific integrated circuit) may be used in the implementation of the computing system 1200. Other modules that may be included with the processor-based device 1210 are speakers, a sound card, a pointing device, e.g., a mouse or a trackball, by which the user can provide input to the computing system 1200. The processor-based device 1210 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" may refer to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the processing unit or external to the processing unit. As used herein the term "memory" refers to any type of long term, short term, volatile, nonvolatile, or other memory and is not to be limited to any particular type of memory or number of memories, or type of storage media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

At least some of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication.

The computing system may include clients and servers. A client and server are generally remote from each other and typically interact through a communication network. The relationship of client and server generally arises by virtue of computer programs running on the respective computers and having a client-server relationship to each other.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method comprising:
   receiving, at a server, beacon data indicative of a location of an asset tag device, the beacon data determined based on beacon signals received at the asset tag device from multiple transmitters that are each associated with a respective one of group values identifying a corresponding one of a plurality of assigned transmitter groups comprising the respective each of the multiple transmitters, each of the assigned transmitter groups associated with a group of proximately deployed transmitters;
   identifying, from the group values, a minority group value associated with a fewest number of transmitters from which the beacon signals were received at the asset tag device;
   excluding a portion of the beacon data associated with the identified minority group value to generate non-excluded beacon data associated with non-excluded group values; and
   determining, at the server, the location of the asset tag device based on the non-excluded beacon data and based on the non-excluded group values respectively associated with non-excluded transmitters from the multiple transmitters from which the beacon signals received at the asset tag device were transmitted, wherein the non-excluded group values associated with the non-excluded transmitters and the non-excluded beacon data do not include the minority group value.

2. The method of claim 1, wherein each of the plurality of assigned transmitter groups comprises at least one transmitter, the transmitter groups generated based on at least one proximity criterion.

3. The method of claim 1, wherein determining the location of asset tag device based on the non-excluded beacon data and on the non-excluded group values further comprises:
   identifying from the beacon data the non-excluded transmitters; and
   determining from a plurality of data records stored at the server the group values respectively associated with the multiple transmitters.

4. The method of claim 3, wherein determining the group values respectively associated with the multiple transmitters comprises:
   matching information included in the received beacon data, identifying the multiple transmitters from which the beacon signals were transmitted, to respective one or more data records from the plurality of data records comprising identifiers identifying the multiple transmitters.

5. The method of claim 1,
   wherein excluding the portion of the beacon data associated with the identified minority group value comprises:
   excluding, at the server, the portion of the beacon data associated with the identified minority group value.

6. The method of claim 5, wherein
   identifying, from the group values, the minority group value comprises:
   identifying, at the server, the minority group value.

7. The method of claim 1,
   wherein excluding the portion of the beacon data associated with the identified minority group value comprises:
   excluding, at the asset tag device, the portion of the beacon data associated with the identified minority group value.

8. The method of claim 7,
   wherein identifying, from the group values, the minority group value comprises:
   identifying, at the asset tag, the minority group value.

9. The method of claim 1, further comprising:
   dynamically generating, at the server, a plurality of group values associated with a plurality of transmitters, the plurality of transmitter including the multiple transmitters; and
   communicating to the plurality of transmitters the dynamically generated plurality of group values.

10. The method of claim 1, wherein the beacon data comprises data representative of measurements performed on at least one of the beacon signals received at the asset tag device.

11. The method of claim 10, wherein the data representative of the measurements performed on the at least one of the beacon signals comprises measurements of signal strength of the at least one of the beacon signals, the signal strength used to determine a received signal strength indication (RSSI) for the at least one of the beacon signals.

12. A server comprising:
    one or more processors; and
    storage media comprising computer instructions that, when executed on the one or more processors, cause operations comprising:
    receiving beacon data indicative of a location of an asset tag device, the beacon data determined based on beacon signals received at the asset tag device from multiple transmitters that are each associated with a respective one of group values identifying a corresponding one of a plurality of assigned transmitter groups comprising the respective each of the multiple transmitters;
    determining the location of asset tag device based on the beacon data received at the server from the asset tag device and on non-excluded group values respectively associated with non-excluded transmitters from the multiple transmitters from which the beacon signals received at the asset tag device were transmitted, wherein the non-excluded group values do not include a minority group value, associated with one of the plurality of assigned transmitter groups, with a fewest number of transmitters from which the beacon signals were received at the asset tag.

13. The server of claim 12, wherein the storage media comprises further computer instructions that, when executed on the one or more processors of the server, cause further operations comprising:
identifying from the beacon data the multiple transmitters from which the beacon signals were transmitted; and
determining from a plurality of data records stored at the server the group values respectively associated with the identified multiple transmitters.

14. The server of claim 13, wherein the storage media comprises further computer instructions that, when executed on the one or more processors of the server, cause further operations comprising:
excluding at least some of the beacon data received at the server based on the group values respectively associated with the identified multiple transmitters; and
deriving the location of the device using only non-excluded beacon data.

15. The server of claim 12, wherein the beacon data received at the server includes data records associated with at least one of the multiple transmitters, the beacon data received at the server excluding data corresponding to other of the multiple transmitters, the excluded data being removed at the asset tag device based on the group values respectively associated with the multiple transmitters.

16. The server of claim 15, wherein the excluded data is associated with the identified minority group value.

17. The server claim 12, wherein the storage media includes further instructions that, when executed on the one or more processors, cause further operations comprising:
dynamically generating a plurality of group values associated with a plurality of transmitters, the plurality of transmitter including the multiple transmitters; and
communicating to the plurality of transmitters the dynamically generated plurality of group values.

18. An asset tag device comprising:
one or more processors; and
storage media comprising computer instructions that, when executed on the one or more processors, cause operations comprising:
receiving beacon signals from multiple transmitters that are each associated with a respective one of group values identifying a corresponding one of a plurality of assigned transmitter groups comprising the respective each of the multiple transmitters;
determining, based on the received beacon signals, beacon data indicative of a location of the asset tag device;
transmitting to a server the beacon data indicative of the location of the asset tag device;
wherein the location of asset tag device is determined based on the beacon data transmitted from the asset tag device and on non-excluded group values, wherein the non-excluded group values do not include a minority group value, associated with one of the plurality of assigned transmitter groups, with a fewest number of transmitters from which the beacon signals were received at the asset tag.

19. The asset tag device of claim 18, wherein the storage media comprises further computer instructions that, when executed on the one or more processors of the asset tag device, cause further operations comprising:
excluding a portion of the beacon data corresponding to at least one of the multiple transmitters based on the group values respectively associated with the multiple transmitters; and
transmitting to the server non-excluded beacon data corresponding to at least one other transmitter of the multiple transmitters.

20. The asset tag device of claim 19, wherein excluding the beacon data corresponding to the at least one of the multiple transmitters comprises:
identifying from the group values respectively associated with the multiple transmitters the minority group value; and
excluding the beacon data corresponding to the at least one of the multiple transmitters associated with the identified minority group value.

* * * * *